(12) United States Patent
Verma

(10) Patent No.: US 10,235,100 B2
(45) Date of Patent: Mar. 19, 2019

(54) OPTIMIZING COLUMN BASED DATABASE TABLE COMPRESSION

(71) Applicant: SAP SE, Walldorf (DE)

(72) Inventor: Sudhir Verma, Gurgaon (IN)

(73) Assignee: SAP SE, Walldorf (DE)

( * ) Notice: Subject to any disclaimer, the term of this patent is extended or adjusted under 35 U.S.C. 154(b) by 275 days.

(21) Appl. No.: 15/244,923

(22) Filed: Aug. 23, 2016

(65) Prior Publication Data

US 2018/0060374 A1 Mar. 1, 2018

(51) Int. Cl.
*G06F 3/06* (2006.01)
*G06F 17/30* (2006.01)

(52) U.S. Cl.
CPC ...... *G06F 3/0673* (2013.01); *G06F 17/30339* (2013.01)

(58) Field of Classification Search
CPC ......... G06F 17/30371; G06F 17/30283; G06F 17/30454; G06F 17/3053; G06F 17/30539; G06F 17/30315; G06F 17/30867
See application file for complete search history.

(56) References Cited

U.S. PATENT DOCUMENTS

| | | | |
|---|---|---|---|
| 7,868,789 B1 | 1/2011 | Binnig et al. | |
| 8,326,810 B2 | 12/2012 | Faerber et al. | |
| 8,653,993 B2 | 2/2014 | Bendel et al. | |
| 8,954,418 B2 * | 2/2015 | Faerber | G06F 17/30404 707/718 |
| 9,418,019 B2 * | 8/2016 | Lepak | G06F 12/121 |
| 9,418,091 B2 * | 8/2016 | Li | G06F 17/30315 |
| 2008/0005077 A1 * | 1/2008 | Eggebraaten | G06F 17/30309 |
| 2008/0294676 A1 | 11/2008 | Faerber et al. | |
| 2012/0143913 A1 * | 6/2012 | Beier | H03M 7/40 707/776 |
| 2014/0156639 A1 * | 6/2014 | Shridhar | G06F 17/30536 707/722 |
| 2014/0201194 A1 * | 7/2014 | Reddy | G06F 17/30554 707/722 |
| 2015/0074066 A1 * | 3/2015 | Li | G06F 17/30315 707/693 |
| 2015/0161100 A1 | 6/2015 | Bhatnagar et al. | |
| 2015/0186434 A1 * | 7/2015 | Eichinger | G06F 17/30551 707/693 |
| 2015/0379073 A1 | 12/2015 | Verma et al. | |
| 2016/0004735 A1 * | 1/2016 | Kazmaier | G06F 17/30315 707/693 |

(Continued)

*Primary Examiner* — Daniel A Kuddus
(74) *Attorney, Agent, or Firm* — Maschoff, Buckley & Talwalkar LLC

(57) ABSTRACT

Various embodiments of systems and methods for optimizing in-memory column based database table compression. A system may receive a parsed in-memory columnar database table as an input and reads an aggregated compression score from memory corresponding to the parsed database table. A total compression score may be computed iteratively for the database table in order to determine whether the total compression score is greater than the aggregated compression score. When the total compression score determined to be greater than the aggregated compression score, the aggregated compression score is assigned to a best compression score. To optimize in-memory database table compression, the given database table may be compressed using the best compression score.

17 Claims, 12 Drawing Sheets

(56) References Cited

U.S. PATENT DOCUMENTS

| | | | |
|---|---|---|---|
| 2016/0004739 A1* | 1/2016 | Tyercha | G06F 17/30333 |
| | | | 707/743 |
| 2016/0092477 A1* | 3/2016 | Said | G06F 17/30303 |
| | | | 707/692 |
| 2016/0342649 A1* | 11/2016 | Chen | G06F 17/30315 |
| 2016/0357798 A1* | 12/2016 | Li | G06F 17/3002 |
| 2017/0039229 A1* | 2/2017 | Verma | G06F 17/30312 |
| 2017/0177633 A1* | 6/2017 | Wenzler | G06F 17/30315 |

* cited by examiner

| | TABLE-A 302 | |
|---|---|---|
| $C_{A1}$ 304 | $C_{A2}$ 306 | $C_{A3}$ 308 |
| 1 | 4 | 2 |
| 1 | 4 | 2 |
| 2 | 3 | 0 |
| 1 | 4 | 2 |
| 0 | 4 | 0 |
| 0 | 2 | 0 |
| 3 | 2 | 1 |
| 1 | 4 | 0 |
| 2 | 0 | 0 |
| 3 | 3 | 0 |
| 4 | 0 | 1 |
| 3 | 1 | 0 |
| 3 | 1 | 3 |
| 0 | 0 | 2 |
| 3 | 2 | 0 |
| 2 | 2 | 2 |
| 3 | 4 | 3 |
| 1 | 4 | 2 |
| 3 | 0 | 3 |
| 1 | 4 | 2 |
| 1 | 1 | 3 |
| 4 | 0 | 1 |

| | TABLE-B 310 | |
|---|---|---|
| $C_{B1}$ 316 | $C_{B2}$ 318 | $C_{B3}$ 320 |
| 1 | 4 | 2 |
| 1 | 4 | 2 |
| 1 | 4 | 0 |
| 1 | 4 | 2 |
| 1 | 4 | 2 |
| 1 | 4 | 3 |
| 2 | 1 | 0 |
| 0 | 3 | 0 |
| 0 | 4 | 0 |
| 3 | 2 | 1 |
| 2 | 2 | 0 |
| 3 | 0 | 0 |
| 4 | 3 | 0 |
| 3 | 0 | 1 |
| 3 | 1 | 0 |
| 0 | 1 | 3 |
| 3 | 0 | 2 |
| 2 | 2 | 1 |
| 3 | 0 | 2 |
| 3 | 2 | 3 |
| 3 | 4 | 3 |
| 4 | 0 | 1 |

| | TABLE-C 312 | |
|---|---|---|
| $C_{C1}$ 324 | $C_{C2}$ 326 | $C_{C3}$ 328 |
| 1 | 4 | 2 |
| 1 | 4 | 2 |
| 1 | 4 | 2 |
| 1 | 4 | 0 |
| 1 | 4 | 2 |
| 1 | 4 | 2 |
| 1 | 1 | 3 |
| 2 | 3 | 0 |
| 0 | 4 | 0 |
| 0 | 2 | 0 |
| 3 | 2 | 1 |
| 2 | 0 | 0 |
| 3 | 3 | 0 |
| 4 | 0 | 1 |
| 3 | 1 | 0 |
| 3 | 1 | 3 |
| 0 | 0 | 2 |
| 3 | 2 | 0 |
| 2 | 2 | 2 |
| 3 | 4 | 3 |
| 3 | 0 | 3 |
| 4 | 0 | 1 |

| | TABLE-D 314 | |
|---|---|---|
| $C_{D1}$ 332 | $C_{D2}$ 334 | $C_{D3}$ 336 |
| 1 | 4 | 2 |
| 1 | 4 | 2 |
| 1 | 4 | 2 |
| 1 | 4 | 2 |
| 1 | 4 | 2 |
| 1 | 4 | 0 |
| 1 | 4 | 3 |
| 2 | 1 | 0 |
| 0 | 3 | 0 |
| 0 | 4 | 0 |
| 3 | 2 | 1 |
| 2 | 2 | 0 |
| 3 | 0 | 0 |
| 4 | 3 | 0 |
| 3 | 0 | 1 |
| 3 | 1 | 0 |
| 0 | 1 | 3 |
| 3 | 0 | 2 |
| 2 | 2 | 1 |
| 3 | 2 | 2 |
| 3 | 4 | 3 |
| 3 | 0 | 3 |
| 4 | 0 | 1 |

FIG. 3A

| Execution No. 502 | Table Identifier 504 | Optimal Bit 506 | Compression Score 508 |
|---|---|---|---|
| 1 | Table id 2 | 1 | 7 |
| 2 | Table id 3 | 0 | 8 |
| 3 | Table id 1 | 0 | 10 |
| 4 | Table id 4 | 1 | 12 |
| 5 | Table id 5 | 1 | 14 |

FIG. 5

OPTIMIZING COLUMN BASED DATABASE TABLE COMPRESSION

FIELD

The disclosed embodiments generally relate to computer systems, and more particularly to methods and systems that facilitate database compression.

BACKGROUND

In in-memory database management system, frequently accessed data are pre-stored in main memory tables, which facilitates faster response time. However, to store data in the in-memory database tables multiple data compression systems are applied to compress data and to reduce memory consumption. Conventional data compression systems may give rise to issues such as long response time when search requests are received to retrieve information from the compressed data. It is a challenge for the conventional data compression systems to improve the search response time and optimize overall database table compression.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 3A is an exemplary block diagram illustrating process for optimizing in-memory column based database table compression, according to one embodiment.

FIG. 5 is an exemplary block diagram illustrating records when a best compression score is computed to optimize in-memory column based database table compression over a given time period, according to one embodiment.

DETAILED DESCRIPTION

Embodiments of techniques for optimizing column based database table compression are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
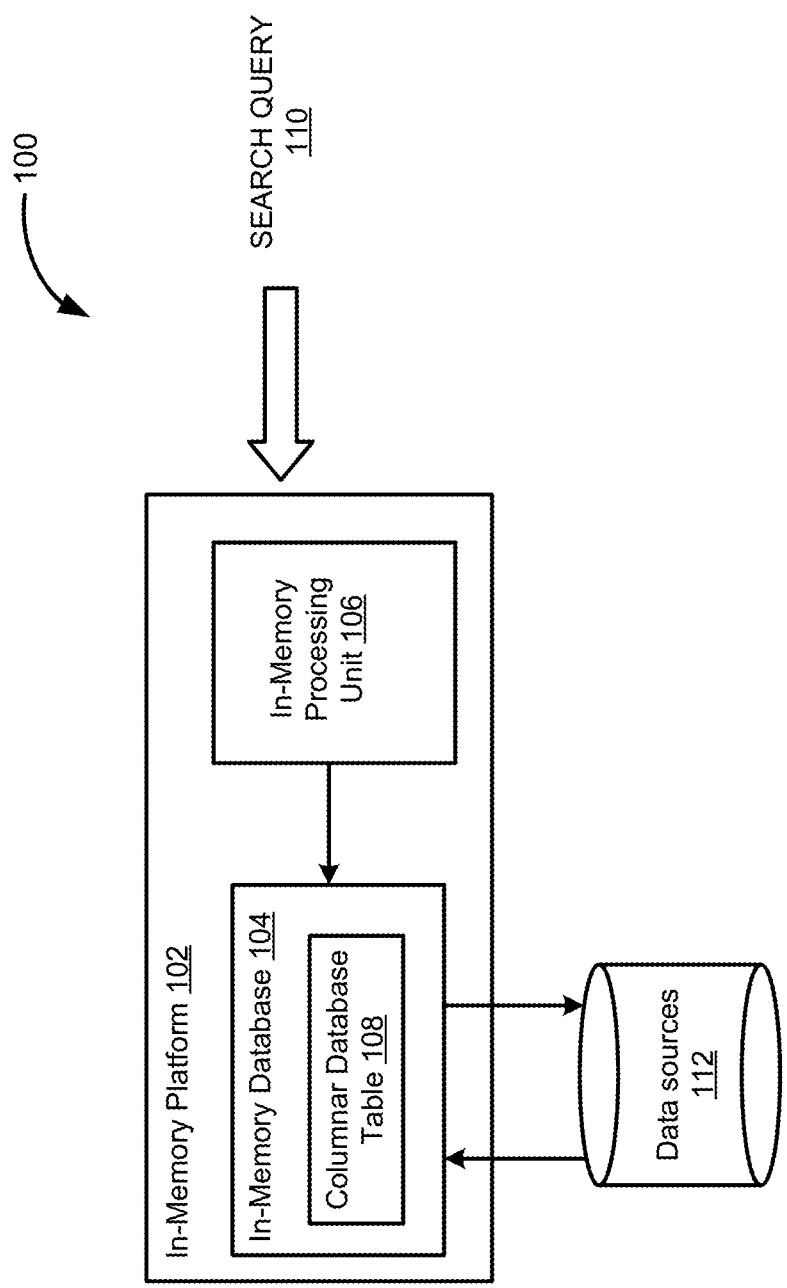
FIG. 1 is a block diagram illustrating implementation of a process to optimize in-memory column based database table compression, according to one embodiment.

FIG. 1 is a block diagram 100 illustrating implementation of a process to optimize in-memory column based database table compression, according to one embodiment. In-memory platform 102 may include in-memory database 104, and in-memory processing unit 106. For example, the in-memory platform 102 may be a SAP HANA® platform. The in-memory database 104 may store columnar database table 108. In the columnar database table 108, data is stored in columns instead of rows. Data stored in columns may have the property of being highly compressed due to which they use less memory units/space. The in-memory processing unit 106 includes computing instructions to compress the columnar database table 108 stored in the in-memory database 104. Additionally, the in-memory processing unit 106 includes computing instructions to optimize memory units required by the compressed columnar database table, due to which optimized columnar database tables use less memory units than the compressed columnar database table.

In one embodiment, the in-memory processing unit 106 retrieves and processes data from the in-memory database 104 based on requests received at the in-memory platform 102. The in-memory processing unit 106 may use one or more processors for processing data. Typically, the in-memory platform 102 may receive requests from applications such as SAP® ERP (enterprise resource planning), SAP® Application Suites, third party applications, etc. The requests may be received in the form of search query 110. The in-memory database 104 may be connected with multiple data sources such as data source 112. The data source 112 is a database located in a server.

Figure 2A:
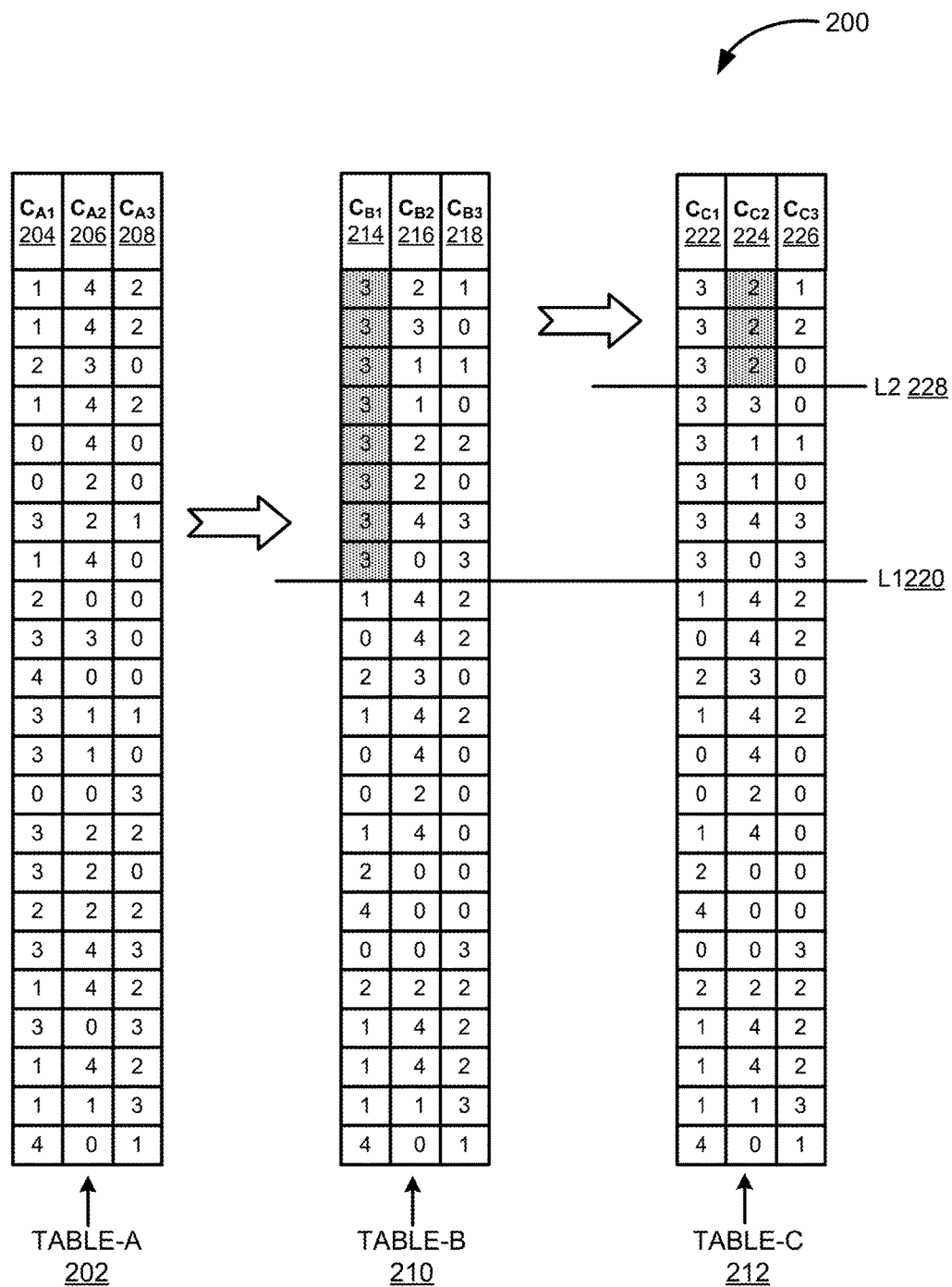
FIG. 2A is an exemplary block diagram illustrating process for computing an aggregated compression score for an in-memory columnar database table, according to one embodiment.

FIG. 2A is an exemplary block diagram illustrating process 200 for computing an aggregated compression score for an in-memory columnar database table, according to one embodiment. In an exemplary embodiment, a given database 'table-A' 202 including three columns '$C_{A1}$' 204, '$C_{A2}$' 206, '$C_{A3}$' 208 with data represented in the form of integers '0' to '4', termed as value-ids. 'Table-A' 202 may be a columnar database table stored in an in-memory database. 'table-B' 210 and 'table-C' 212 illustrates different instances of the 'Table-A' 202, while determining the aggregated compression score ($A_{CS}$).

Scanning of the columns '$C_{A1}$' 204, '$C_{A2}$' 206, and '$C_{A3}$' 208 may be prioritized based on computing instruction provided. Typically, scanning is initiated from leftmost column and move towards last column on the right of the 'table-A' 202. Scanning and sorting of column '$C_{A1}$' 204 of 'table-A' 202 is initiated based on a maximum number of occurrences of the value-id, which may also be referred to as dominant value-id. For example, column '$C_{A1}$' 204 has four value-ids '0', '1', '2', '3', and '4'. Among the four value-ids, value-id '3' is identified to be the dominant value-id in column '$C_{A1}$' 204, since, value-id '3' has a maximum number of occurrences, '8' times compared to other value-ids. While sorting the column '$C_{A1}$' 204, records with the dominant value-id '3' are grouped together. The grouped records may be shifted to the top of the 'table-A' 202. For example, as shown in '$C_{B1}$' 214 of 'table-B' 210, records with the dominant value-id '3' are grouped and shifted to the top of the 'table-B' 210. A record may also correspond to a row of the in-memory columnar database table. Value-ids in columns '$C_{B2}$' 216 and '$C_{B3}$' 218 corresponding to the value-id '3' of '$C_{B1}$' 214 are also shifted to the top of 'table-B' 210. Grouping and shifting of records across all the columns prevent integrity of data.

Next, scanning and sorting process is initiated in column '$C_{B2}$' 216 of the 'table-B' 210 corresponding to the dominant value-id '3' already selected in column '$C_{B1}$' 214. This is shown by pointer 'L1' 220. While scanning and sorting column '$C_{B2}$' 216, the dominant value-id is identified as '2', since, value-id '2' has a maximum number of occurrences, '3' times. Records with the dominant value-id '2' in column '$C_{B2}$' 216 are shifted to the top, as shown in column '$C_{C2}$' 224 of 'table-C' 212. The 'table-C' 212 has three columns '$C_{C1}$' 222, '$C_{C2}$' 224 and '$C_{C3}$' 226. Value-ids in column '$C_{C3}$' 226 associated with the value-id '2' in '$C_{C2}$' 224 are also shifted to the top of 'table-C' 212.

Next, the scanning and sorting process is initiated in column '$C_{C3}$' 226 of the 'table-C' 212 corresponding to the dominant value-ids '3' and '2' already selected in columns '$C_{B1}$' 214 and '$C_{C2}$' 224 respectively. This is shown by the pointer 'L1' 220 and pointer 'L2' 228. This may be executed recursively or in a loop to determine dominant value-ids in the subsequent columns till a maximum number of occurrences of all the value-ids are one in a particular column, or till last column in the given database table, e.g. 'table-A' 202 is scanned and sorted. The recursive loop may when either of the above mentioned criteria is satisfied. For example, as shown is FIG. 2A, since, column '$C_{C3}$' 226 of the 'table-C' 212 includes value-ids distinct from each other and the maximum number of occurrences of value-id is '1', the method 200 exits from the recursive loop. Once all the columns in the given database table 'table-A' 202 are scanned and sorted based on the maximum number of occurrences of value-ids, as shown in 'table-B' 210 and 'table-C' 212, a compression score (CS) is calculated for each column of the 'table-A' 202. The aggregated compression score ($A_{CS}$) is obtained by aggregating the compression scores (CSs) of all columns of the 'table-A' 202.

The compression score (CS) may be computed by applying the formula, CS=(maximum number of occurrences of the dominant value-id in a particular column–2). The reason behind subtracting '2' from the maximum number of occurrences of the dominant value-id is that, firstly, '1' memory unit is required to retain at least one instance of the value-id in the in-memory columnar database table. Secondly, another '1' memory unit is required to store count of maximum number of occurrences of the dominant value-id. The compression score ($CS_{A1}$) of column '$C_{A1}$' 204 of 'table-A' 202 may be computed, $CS_{A1}$=(maximum number of occurrences of value-id '3' in column '$C_{B1}$' 214 of 'table-B' 210–2), i.e. $CS_{A1}$=(8–2)=6. The compression score ($CS_{A2}$) of column '$C_{A2}$' 206 of 'table-A' 202 may be computed, $CS_{A2}$=(maximum number of occurrences of value-id '2' in column '$C_{C2}$' 222 of 'table-C' 212–2), i.e. $CS_{A2}$=(3–2)=1. The compression score ($CS_{A3}$) of column '$C_{A3}$' 208 of 'table-A' 202 may be computed, $CS_{A3}$=(maximum number of occurrences of value-id '1' in column '$C_{C3}$' 226 of 'table-C' 212–2). The compression score of column '$C_{A3}$' 208 of 'table-A' 202 computed as '0', since, corresponding to pointer 'L1' 220, the value-ids in the column '$C_{C3}$' 226 are non-repetitive and distinct from one another. Finally, the aggregated compression score ($A_{CS}$) is computed by applying the formula, $A_{CS}$=($CS_{A1}$+$CS_{A2}$+$CS_{A3}$), $A_{CS}$='7' (6+1+0), for 'table-A' 202. The aggregated compression score ($A_{CS}$=7) may be considered as a best compression score ($B_{CS}$), since, it has been obtained by selecting dominant value-ids across all the columns '$C_{A1}$' 204, '$C_{A2}$' 206, and '$C_{A3}$' 208 of the 'table-A' 202.

The best compression score ($B_{CS}$) may also indicate memory consumption of the 'table-A' 202. For example, for storage, each of the value-id consumes '1' memory unit, and another '1' memory unit to store number of occurrences of the value-ids. Since, there are '23' records in each of the columns '$C_{A1}$' 204, '$C_{A2}$' 206 and '$C_{A3}$' 208 of the 'table-A' 202, the memory units consumed to store '23' records of '$C_{A1}$' 204 is '23' memory units; memory consumed to store '23' records of '$C_{A2}$' 206 is '23' memory units; and memory consumed to store '23' records of '$C_{A3}$' 208 is '23' units. Aggregating the memory units to store the records of the three columns '$C_{A1}$' 204, '$C_{A2}$' 206, and '$C_{A3}$' 208, total memory consumed is '69' (23+23+23) memory units to store 'table-A' 202. The memory units are measured in bytes. In one embodiment, the aggregated compression score ($A_{CS}$=7) for 'table-A' 202 may be computed using prefix length encoding approach in combination with greedy approach. The prefix length encoding approach compresses duplicate data while the greedy approach selects the maximum of number of duplicate data. The prefix length encoding approach in combination with the greedy approach is able to select the maximum number of duplicate data for database table compression.

Memory consumed to store a given in-memory columnar database table, e.g. 'table-A' 202 may be computed by using following equation (1):

$$M = \sum_{i=1}^{N}(T-(C_i-2)x_i) \qquad \text{eq. (1)}$$

where,

'M' is memory units consumed in bytes to store the given database table, e.g. 'table-A' 202, 'T' is total number of records in the given database table, '$C_i$' corresponds to a maximum number of occurrences of a dominant value-id in $i^{th}$ column of the given database table; and '$x_i$' is a binary variable with an integer value, when ($C_i$>1) then ($x_i$=1), when ($C_i$≤1) then ($x_i$=0).

Based on the aggregated compression score ($A_{CS}$) computed for the 'table-A' 202, the best compression score ($B_{CS}$) is considered as '7'. The number of records in each of the columns '$C_{A1}$' 204, '$C_{A2}$' 206, and '$C_{A3}$' 208 of the 'table-A' 202 is '23', therefore, (T=23).

Memory consumed to store '23' records of '$C_{A1}$' 204 is '17' (23−7+1) memory units, i.e. ((total number of records (23) in column '$C_{A1}$' 204)−(number of records (8−1) to be compressed in the column '$C_{A1}$' 204 corresponding to value-id '3')+(memory units (1) required to store maximum number of occurrences (8) of value-id '3' in column '$C_{A1}$' 204)). Memory consumed to store '23' records of '$C_{A2}$' 206 is '22' (23−2+1) memory units, i.e. ((total number of records (23) in column '$C_{A2}$' 206)−(number of records (3−1) to be compressed in the column '$C_{A2}$' 206 corresponding to value-id '2')+(memory in bytes (1) required to store number of occurrences (3) of value-id '2' in the column '$C_{A2}$' 206)). Memory consumed to store '23' records of '$C_{A3}$' 208 is '23' (23−0+0) bytes, since number of records to be compressed in the '$C_{A3}$' 208 is '0', i.e. corresponding to pointer 'L2' 228 there is no repetitive value-id, as shown in column '$C_{C3}$' 226 of 'table-C' 212. Finally, total memory consumed is '62' (17+22+23) memory units to store 'table-A' 202. The memory consumed to store 'table-A' 202 is improved by '10.145' percentage, i.e. (((total memory units (69) required by the 'table-A' 202)−(memory units (62) required by 'table-A' 202 when compressed using best compression score ($B_{CS}$=7))/(total memory units (69) required by the 'table-A' 202))*100) percentage, when compared with '69' memory units required to store the entire content of 'table-A' 202. Therefore, using the computed aggregated compression, memory consumed by the given in-memory columnar database table is improved.

Figure 2B:
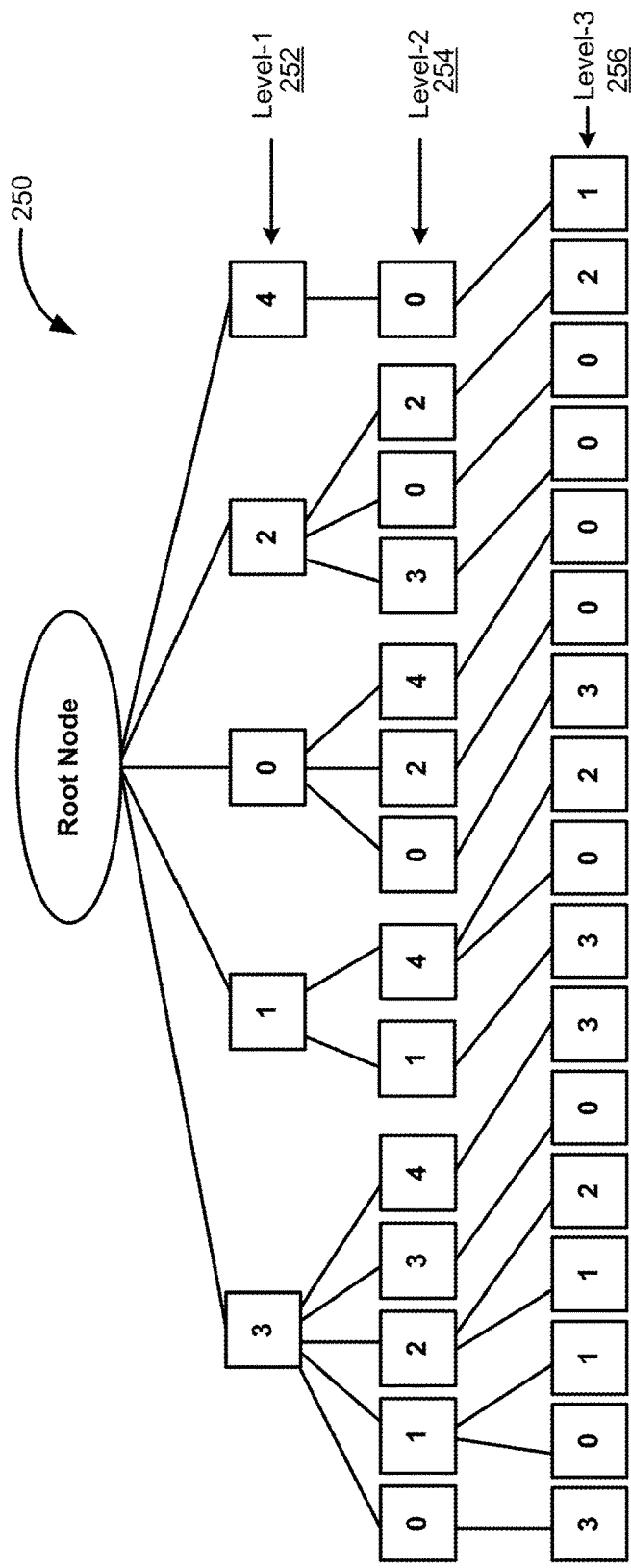
FIG. 2B is an exemplary graphical representation illustrating a tree generated based on 'table-A' of FIG. 2A, according to one embodiment.

FIG. 2B is an exemplary graphical representation illustrating a tree 250 generated based on 'table-A' of FIG. 2A, according to one embodiment. Tree 250 includes a root node and multiple other branch nodes represented with value-ids '0', '1', '2', '3' and '4' from the columns '$C_{A1}$' 204, '$C_{A2}$' 206, and '$C_{A3}$' 208. The root node and branch nodes are referred to as nodes. The tree 250 may include three levels, 'Level-1' 252, 'Level-2' 254, and 'Level-3' 256 that represent value-ids from a particular column of the 'table-A' 202. For example, 'Level-1' 252 represents value-ids from column '$C_{A1}$' 204; 'Level-2' 254 represents value-ids from column '$C_{A2}$' 206; and 'Level-3' 256 represents value-ids from column '$C_{A3}$' 208 of the 'table-A' 202. When a path XYZ is selected that include nodes (3, 0, 3) from the root node, value-id '3' of 'Level-1' 252 represents selection of value-id '3' in column '$C_{A1}$' 204; value-id '0' of 'Level-2' 254 represents selection of value-id '0' in column '$C_{A2}$' 206 with respect to selected value-id '3' in column '$C_{A1}$' 204; and value-id '3' of 'Level-3' 258 represents selection of value-id '3' in column '$C_{A3}$' 208 with respect to selected value-ids '3' and '0' in columns '$C_{A1}$' 204 and '$C_{A2}$' 206, respectively. As shown in FIG. 2B, with five unique value-ids, represented in the form of integers '0' to '4', and three columns with '23' records in each of the columns. The tree 250 is generated that include '36' nodes. To compute an aggregated compression score ($A_{CS}$) for the 'table-A' 202, as described in FIG. 2A, ($A_{CS}$=7), traversing all '36' nodes is inevitable. In addition, to compute a new aggregated compression score ($A_{CS}$) for the 'table-A' 202 that is greater than the best compression score ($B_{CS}$=7), described in FIG. 2A, repetitively traversing all '36' nodes may become inevitable. Repetitively traversing all '36' nodes again and again for database table compression may be time consuming.

In another exemplary embodiment, consider a columnar database table that has three columns and one hundred thousand (100,000) unique value-ids with billions of transaction data. In this case, a dominant value-id selected from first column may lead to 100,000 possible combination for second column, and another 100,000 possible combinations for third column, depending upon number of occurrences of the value-ids in each columns. Graphical representation of such table will illustrate 100,000×100,000×100,000=$10^{15}$ combination of paths and nodes, if a tree is generated for such huge transactional data. To determine the aggregated compression score ($A_{CS}$) or the new aggregated compression score ($A_{CS}$) for the database table that maximizes the overall table compression, traversing $10^{15}$ combination of possible paths and nodes may become inevitable. This approach may lead to long processing time and memory issues when there are one hundred thousand unique value-ids and billions of transactional data.

FIG. 3A is an exemplary block diagram 300 illustrating process for optimizing in-memory column based database table compression, according to one embodiment. After execution of the process, described in FIG. 2A, to compute the aggregated compression score ($A_{CS}$=7) for the in-memory columnar database table 'table-A' 302, FIG. 3A is executed to optimize the 'table-A' 302 compression. Once the best compression score ($B_{CS}$=7) is computed, as described in FIG. 2A, an aggregated compression score ($A_{CS}$) greater than the best compression score ($B_{CS}$=7) is computed to optimize overall 'table-A' 302 compression. In an exemplary embodiment, the database 'table-A' 302 has three columns '$C_{A1}$' 304, '$C_{A2}$' 306, '$C_{A3}$' 308 with records represented in the form of integers '0', '1', '2', '3' and '4', termed as value-ids. The 'table-A' 302 is a columnar database table stored in an in-memory database. The computed aggregated compression score ($A_{CS}$) greater than the best compression score ($B_{CS}$) may be able to maximize overall table compression than the best compression score ($B_{CS}$=7).

The 'table-A' 302 is parsed as an input. The best compression score ($B_{CS}$=7), as described in FIG. 2A, may be computed and stored in memory. The best compression score ($B_{CS}$=7) may be read from the memory corresponding to the 'table-A' 302. Database tables such as 'table-B' 310, 'table-C' 312, and 'table-D' 314 illustrates different instances of the 'table-A' 302 while computing the aggregated compression score ($A_{CS}$). Scanning and sorting is initiated from leftmost column '$C_{A1}$' 304 of the 'table-A' 302. Column '$C_{A1}$' 304 may be sorted based on number of occurrences of value-id other than the dominant value-id '3' that is used for computing the best compression score ($B_{CS}$=7), as shown in FIG. 2A. As shown in column '$C_{B1}$' 316 of 'table-B' 310, value-id '1' is selected that has a maximum number of occurrences, '7' times. Since, the value-id '1' has a maximum number of occurrences closest to the maximum number of occurrences, '8' times of the value-id '3' in column '$C_{B1}$' 316. The 'table-B' 310 has three columns '$C_{B1}$' 316, '$C_{B2}$' 318, and '$C_{B3}$' 318. In order to compute the aggregated compression score ($A_{CS}$) greater than the best compression score ($B_{CS}$=7), value-id '1' may be selected. Value-id '1' has a maximum number of occurrences, '7' times, i.e. occurrences of the value-id '1' is greater than the other value-ids '0', '2', and '4' in the column '$C_{B1}$' 316. Records in the column '$C_{B1}$' 316 are grouped and shifted to the top of 'table-B' 310. In addition, records in columns '$C_{B2}$' 318, and '$C_{B3}$' 320 are shifted to the top corresponding to value-id '1' selected in column '$C_{B1}$' 316, as shown in 'table-B' 310. This may be indicated by pointer 'L1' 322. The value-ids are grouped and shifted to the top across all the columns of the 'table-B' 310 to prevent loss of data in the subsequent columns.

Next, scanning and sorting process is initiated in column '$C_{B2}$' 318 of the 'Table-B' 310 corresponding to the value-id '1' already selected in column '$C_{B1}$' 316. The value-ids in column '$C_{B2}$' 318 are sorted till the pointer 'L1' 322. Upon scanning and sorting, dominant value-id '4' has a maximum number of occurrences, '6' times in column '$C_{B2}$' 318. Records with the dominant value-id '4' in column '$C_{B2}$' 318 are grouped and shifted to the top, as shown in columns '$C_{C2}$' 326 and '$C_{C3}$' 328 of 'table-C' 312. This is indicated by pointer 'L2' 330. The value-ids are grouped and shifted to the top across all the columns of the 'table-C' 312 to prevent loss of data in the subsequent columns.

Next, the scanning and sorting process is initiated in column '$C_{C3}$' 328 of the 'table-C' 312 corresponding to the value-id '1' and the dominant value-id '4' already selected in columns '$C_{B1}$' 316 and '$C_{C2}$' 326. The 'table-C' has three columns '$C_{C1}$' 324, '$C_{C2}$' 326 and '$C_{C3}$' 328. The value-ids in column '$C_{C3}$' 328 are sorted till the pointer 'L2' 330. Records with the dominant value-id '2' in column '$C_{C3}$' 328 are grouped and shifted to the top, as shown in column '$C_{D3}$' 336 of 'table-D' 314. This is indicated by pointer 'L3' 338. The 'table-D' 314 includes three columns '$C_{D1}$' 332, '$C_{D2}$' 334, and '$C_{D3}$' 336.

To identify dominant value-ids in the subsequent columns continues in a recursive loop till the number of occurrences of the value-id is zero in a particular column or till last column in the given database table, e.g. 'table-A' 302. The recursive loop exits when either of the abovementioned conditions are satisfied or met. For example, as shown is FIG. 3A, the recursive loop exits after scanning and sorting column '$C_{D3}$' 336 of the 'table-D'. Since, there does not exist any columns beyond '$C_{A3}$' 308 in 'table-A' 302. The value-ids in column '$C_{D3}$' 336 are sorted till the pointer 'L3' 338. The dominant value-id '2' has maximum number of occurrences, '5' times, selected in column '$C_{D3}$' 330 of the 'table-D' 308.

Once all the columns '$C_{A1}$' 304, '$C_{A2}$' 306, '$C_{A3}$' 308 of 'Table-A' 302 are scanned and sorted, the aggregated compression score ($A_{CS}$) is determined by aggregating compression scores (CSs) of each columns. The compression score (CS) may be computed by applying the formula, CS= (maximum number of occurrences of the dominant value-id in a particular column−2). The compression score ($CS_{A1}$) of column '$C_{A1}$' 304 of 'Table-A' 302 may be computed, $CS_{A1}$=((value-id '1' has maximum number of occurrences, '7' times)−2), i.e. $CS_{A1}$=(7−2)=5. The compression score ($CS_{A2}$) of column '$C_{A2}$' 306 of 'Table-A' 302 may be computed, $CS_{A2}$=((value-id '4' has maximum number of occurrences, '6' times)−2), i.e. $CS_{A2}$=(6−2)=4. The compression score ($CS_{A3}$) of column '$C_{A3}$' 308 of 'Table-A' 302 may be computed, $CS_{A3}$=((value-id '2' has maximum number of occurrences, '5' times)−2), i.e. $CS_{A3}$=(5−2)=3. The reason behind subtracting '2' from the maximum number of occurrences of the dominant value-id is that, firstly, '1' memory unit required to retain at least one instance of the value-id in the in-memory columnar database table. Secondly, another '1' memory unit required to store count of maximum number of occurrences of the dominant value-id.

Finally, the aggregated compression score (Acs) may be computed a summation of the compression scores (CSs) of each columns, i.e. $A_{CS}$=($CS_{A1}$+$CS_{A2}$+$CS_{A3}$)=(5+4+3)=12. When compared with the computed best compression score ($B_{CS}$=7), as described in FIG. 2A, computed for 'table-A' 302, the aggregated compression score ($A_{CS}$) is greater than the best compression score ($B_{CS}$=7), i.e. (12>7). Therefore, the aggregated compression score ($A_{CS}$) may be able to maximize the overall compression of the 'table-A' 302.

Memory consumed to store the 'table-A' 302 in the memory is computed using equation (eq. 1, shown in paragraph [0026]). Memory ($M_{A1}$) consumed to store '23' records of column '$C_{A1}$' 304 may be computed by applying formula, $M_{A1}$=((total number of records (23) in column '$C_{A1}$' 304)−(number of records (7−1) to be compressed in the column '$C_{A1}$' 304 corresponding to value-id '1')+('1' memory unit required to store number of occurrences (7) of value-id '1')), i.e. $M_{A1}$=(23−6+1)='18' memory units.

Memory ($M_{A2}$) consumed to store '23' records of '$C_{A2}$' 306 may be computed by applying formula, $M_{A2}$=(total number of records (23) in column '$C_{A2}$' 306)−(number of records (6−1) to be compressed in the column '$C_{A2}$' 306 corresponding to value-id '4')+('1' memory unit required to store number of occurrences of value-id '4' in the column '$C_{A2}$' 306)), i.e. $M_{A2}$=(23−5+1)='19' memory units. Memory ($M_{A3}$) consumed to store '23' records of '$C_{A3}$' 308 may be computed by applying formula, $M_{A3}$=((total number of records (23) in column '$C_{A3}$' 308)−(number of records (5−1) to be compressed in the column '$C_{A3}$' 308 corresponding to value-id '2')+('1' memory unit required to store number of occurrences of value-id '2' in the column '$C_{A3}$' 308)), i.e. $M_{A3}$=(23−4+1)='20' memory units. Finally, total memory (M) consumed is '57' (18+19+20) memory units to store 'table-A' 302. Therefore, the aggregated compression score ($A_{CS}$=12) maximizes the overall 'table-A' 302 compression by '17.39' percentage, i.e. (((total memory units (69) required by the 'table-A' 202)−(memory units (57) required by 'table-A' 202 when compressed using best compression score ($A_{CS}$=12))/(total memory units (69) required by the 'table-A' 202))*100). When compared with the best compression score ($B_{CS}$=7), described in FIG. 2A, the memory consumption is '10.145' percentage, using the aggregated compression score ($A_{CS}$=12), the memory consumption of 'table-A' 302 is improved by '7.24' (17.39−10.145) percentage. Therefore, the aggregated compression score ($A_{CS}$=12) is assigned to the best compression score ($B_{CS}$), i.e. $B_{CS}$=12.

Figure 3B:
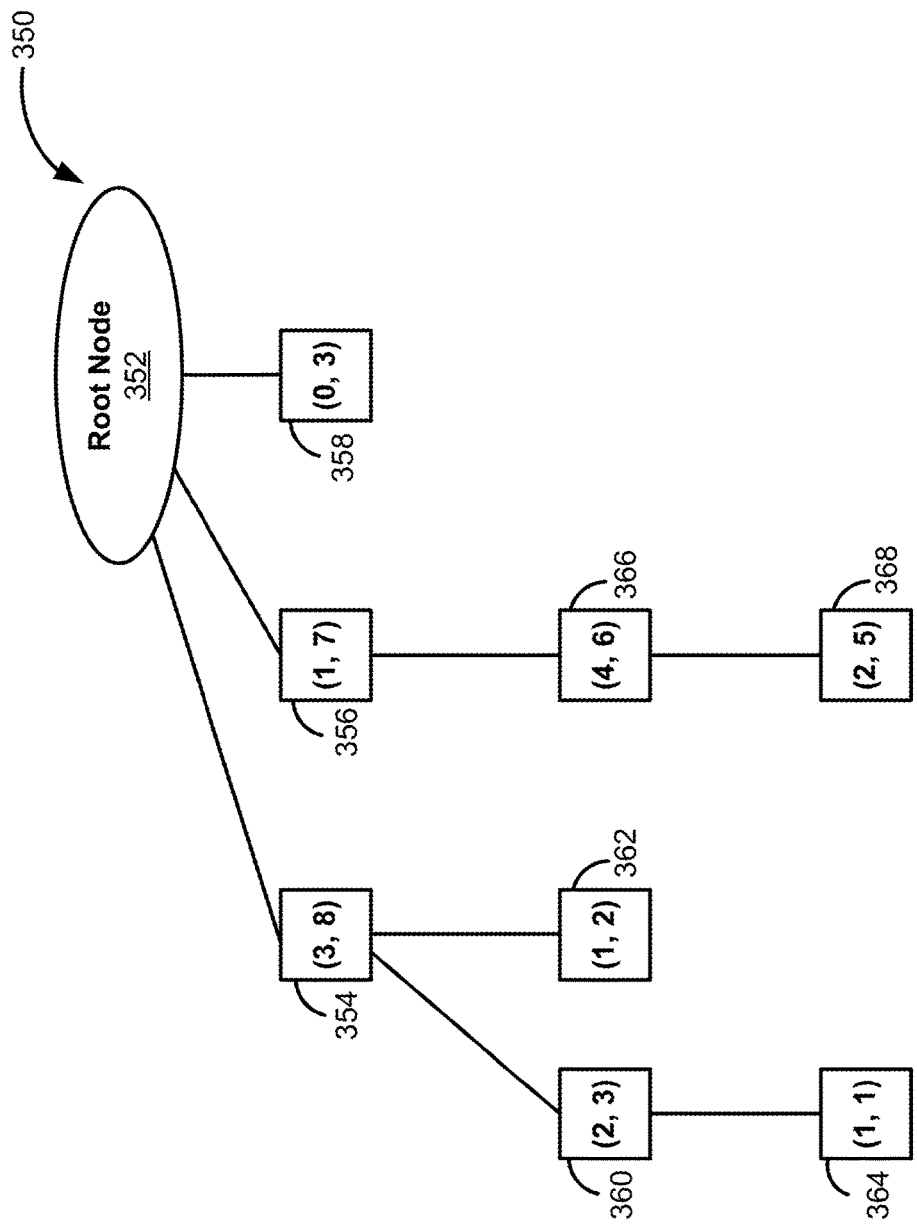
FIG. 3B is an exemplary graphical representation illustrating a tree generated based on 'table-A' of FIG. 3A, according to one embodiment.

FIG. 3B is an exemplary graphical representation illustrating a tree 350 generated based on 'table-A' of FIG. 3A, according to one embodiment. The tree 380 is generated based on contents of 'table-A', as described in FIG. 3A, includes three columns, namely, first column, second column and third column, along with '23' records. A record includes a combination of value-ids in a particular row of the 'table-A'. The tree 350 include root node and branch node, generated based on the value-ids in the columns of the 'table-A'. The root node and branch nodes are referred to as nodes. In addition, for traversing the tree 350, each node in the tree 350 includes a child pointer and parent pointer. To generate the tree 350, a solution vector may be initialized to build and traverse the tree 350. The solution vector also keeps track of the nodes traversed in a particular nodal path. The solution vector is an array in which data is allocated in contiguous memory. When the solution vector traverses to a particular node in the tree 350, it may store an address, value-id and maximum number of occurrences of the value-id of that particular node. The solution vector uses the child pointer and parent pointer of the nodes to build and traverse the tree 350. Since, the solution vector has to keep track of the nodes it traverses, the size of the solution vector may also grow.

A branch of the tree 350 may also represent a particular nodal path. Each of the nodes in the tree 350 represents a set of information such as a value-id selected from a particular column; maximum number of occurrences of the value-id in that column; a next column list (NCList), not shown in FIG. 3B. The NCList is a list of value-ids and its maximum number of occurrences in a subsequent column with respect to a selected value-id in the previous column. The NCList may be represented as (value-id, maximum number of occurrences of the value-id in a particular column). For example, (3, 8) i.e. value-id '3' has maximum of number of occurrences, '8' times in the first column of 'table-A'.

At first, a root node 352 is generated and value-ids in the first column of the 'table-A' is scanned and sorted. The solution vector traverses to the root node 352. For the root node 352, the value-id is null and maximum number of occurrences of the value-id is null. $\text{NCList}_{rootnode352}$ is generated that includes a set={(3, 8), (1, 7), (0, 3), (2, 2), (4, 2)}. Child nodes based on the maximum number of occurrences of the value-ids in the first column are generated such as node 354 (3, 8), node 356 (1, 7), and node 358 (0, 3). Nodes with $\text{NCList}_{rootnode352}$ set items (2, 2) and (4, 2) are not generated or avoided. Since, maximum number of occurrences of the value-ids '2' and '4', '2' times in the first column of the 'table-A'. These two value-ids may not be helpful in computing an aggregated compression score ($A_{CS}$) greater than the value-ids '3', '1' or '0' has maximum number of occurrences, '8', '7' and '3' times respectively in the first column. A projected compression score (PCS) is determined, whether to generate nodes with the $\text{NCList}_{rootnode382}$ set items {(3, 8), (1, 7), (0, 3), (2, 2), (4, 2)}, using following equation (eq. 2):

$$PCS_i = CS_{i-1} + ((N-i)*T*O_i)) \quad \text{eq. 2}$$

where,

'i' & 'j' represent index for columns of the in-memory columnar database table;

N is number of columns in the in-memory columnar database table;

$O_i$ is number of occurrences of value-id in $i^{th}$ column corresponding to value-id selected in the previous column;

$CS_i$ is compression score calculated as summation of occurrences of selected value-ids till $(i-1)^{th}$ column;

$PCS_i$ is projected compression score for selecting a specific value-id in $i^{th}$ column; T is decimal number ranges from '0' to 1), this may be either automatically or manually set by an administrator.

For example, $PCS_{(3, 8)}=(0+(3-1)*0.2*8)=3.2$; $PCS_{(1, 7)}=(0+(3-1)*0.2*7)=2.8$; $PCS_{(0, 3)}=(0+(3-1)*0.2*3)=1.3$; $PCS_{(2, 2)}=(0+(3-1)*0.2*2)=0.8$; $PCS_{(4,2)}=(0+(3-1)*0.2*2)=0.8$. T=0.2, is set by the administrator. Since, the projected compression scores ($PCS_{(2,2)}$ and $PCS_{(4,2)}$) are comparatively less than the projected compression scores ($PCS_{(3, 8)}$, $PCS_{(1, 7)}$ and $PCS_{(0, 3)}$), therefore, generation of nodes with the $\text{NCList}_{rootnode382}$ set items (2, 2) and (4, 2) are avoided. This helps in pruning the tree 350. Nodes generated from each column of the 'table-A' represents a level in the tree 350. For example, node 354 (3, 8), node 356 (1, 7), and node 358 (0, 3) may be first level nodes generated in the tree 350.

NCLists' for the node 354 (3, 8), node 356 (1, 7), and node 358 (0, 3) are generated based on value-ids and maximum occurrence in the second column of the 'table-A'. For example, $\text{NCList}_{node354(3,8)}$ include set items {(2, 3), (1, 2), (3, 1), (4, 1), (0, 1)}, when value-id '3' has a maximum number of occurrences, '8' times, is selected in the first column. $\text{NCList}_{node356(1,7)}$ include set items {(4, 6), (1, 1)}, when value-id '1' that has a maximum number of occurrences, '7' times, selected in the first column. $\text{NCList}_{node358(0,3)}$ include set items {(0, 1), (2, 1), (4, 1)}, when value-id '0' that has a maximum number of occurrences, '3' times, selected in the first column.

The solution vector traverses to the node 354 (3, 8), when compared with the node 356 (1, 7), value-id '3' has a maximum number of occurrences, '8' times than the value-id '1'. In addition, the projected compression score ($PCS_{(3,8)}$) of the $\text{NCList}_{rootnode382}$ set item (3, 8) is greater than the other set items (1, 7) and (0, 3). A compression score (CS) may be computed for the node 354 (3, 8). The compression score (CS) is computed by subtracting '2' memory units from the maximum number of occurrences of the value-id. Currently, the solution vector traverses to the node 364 (3, 8). The compression score (CS) computed for the node 364 (3, 8), $CS_{node354(3,8)}=(8-2)='6'$.

Child nodes based on the $\text{NCList}_{node354(3, 8)}$ set items are generated from the node 354 (3, 8) such as node 360 (2, 3) and node 362 (1, 2), as shown in FIG. 3B. Nodes with $\text{NCList}_{node354(3, 8)}$ set items (3, 1), (4, 1) and (0, 1) are not generated. Since, value-ids '3', '4' and '0' has a maximum number of occurrences, '1' times in the second column, with respect to the value-id '3' already selected in the first column of the 'table-A'. These three value-ids may not be helpful in computing the aggregated compression score ($A_{CS}$) greater than the value-ids '2' and '1' that has a maximum number of occurrences, '3' and '2' times respectively. Using equation (eq. 2, shown in paragraph [0042]), the projected compression score (PCS) is determined whether to generate nodes with the $\text{NCList}_{node354(3,8)}$ set items {(2, 3), (1, 2), (3, 1), (4, 1), (0, 1)}. For example, $PCS_{(2, 3)}=(6+(3-2)*0.2*3)=6.6$; $PCS_{(1, 2)}=(6+(3-2)*0.2*2)=6.4$; $PCS_{(3, 1)}=(6+(3-2)*0.2*1)=6.2$; $PCS_{(4, 1)}=(6+(3-2)*0.2*1)=6.2$; $PCS_{(0, 1)}=(6+(3-2)*0.2*1)=6.2$. Since, the projected compression scores ($PCS_{(3,1)}$, $PCS_{(4,1)}$ and $PCS_{(0,1)}$) are identical and comparatively less than the projected compression scores ($PCS_{(2,3)}$ and $PCS_{(1,2)}$), therefore, generation of nodes with the $\text{NCList}_{node354(3,8)}$ set items (3, 1), (4, 1) and (0, 1) are avoided. This helps in pruning the tree 350. Node 360 (2, 3) and node 362 (1, 2) are second level nodes generated in the tree 350 with node 354 (3, 8) already traversed at the first level.

NCLists' for the node 360 (2, 3) and node 362 (1, 2) are generated based on value-ids and maximum of occurrence in the third column of the '6able-A'. For example, $\text{NCList}_{node360(2, 3)}$ include set items {(1, 1), (2, 1), (0, 1)}, when the value-ids '2' and '3' that has a maximum number of occurrences, '3' and '8' times, are selected in the second column and first column respectively. $\text{NCList}_{node362(1, 2)}$ include set items {(1, 1), (0, 1)}, when the value-ids '1' and '3' that has a maximum number of occurrences '2' and '8' times, are selected in the second column and first column respectively.

The solution vector traverses to the node 360 (2, 3) from the node 354 (3, 8), since, value-id '2' has a maximum number of occurrences, '3' times that is greater than the maximum number of occurrences, '2' times of the value-id '1' in the second column. In addition, the projected compression score of the $\text{NCList}_{node354(3,8)}$ set item (2, 3) is greater than the set item (1, 2). The compression score (CS) is computed as, $CS_{node360(2,3)}=(3-2)=1$.

Figure 3C:
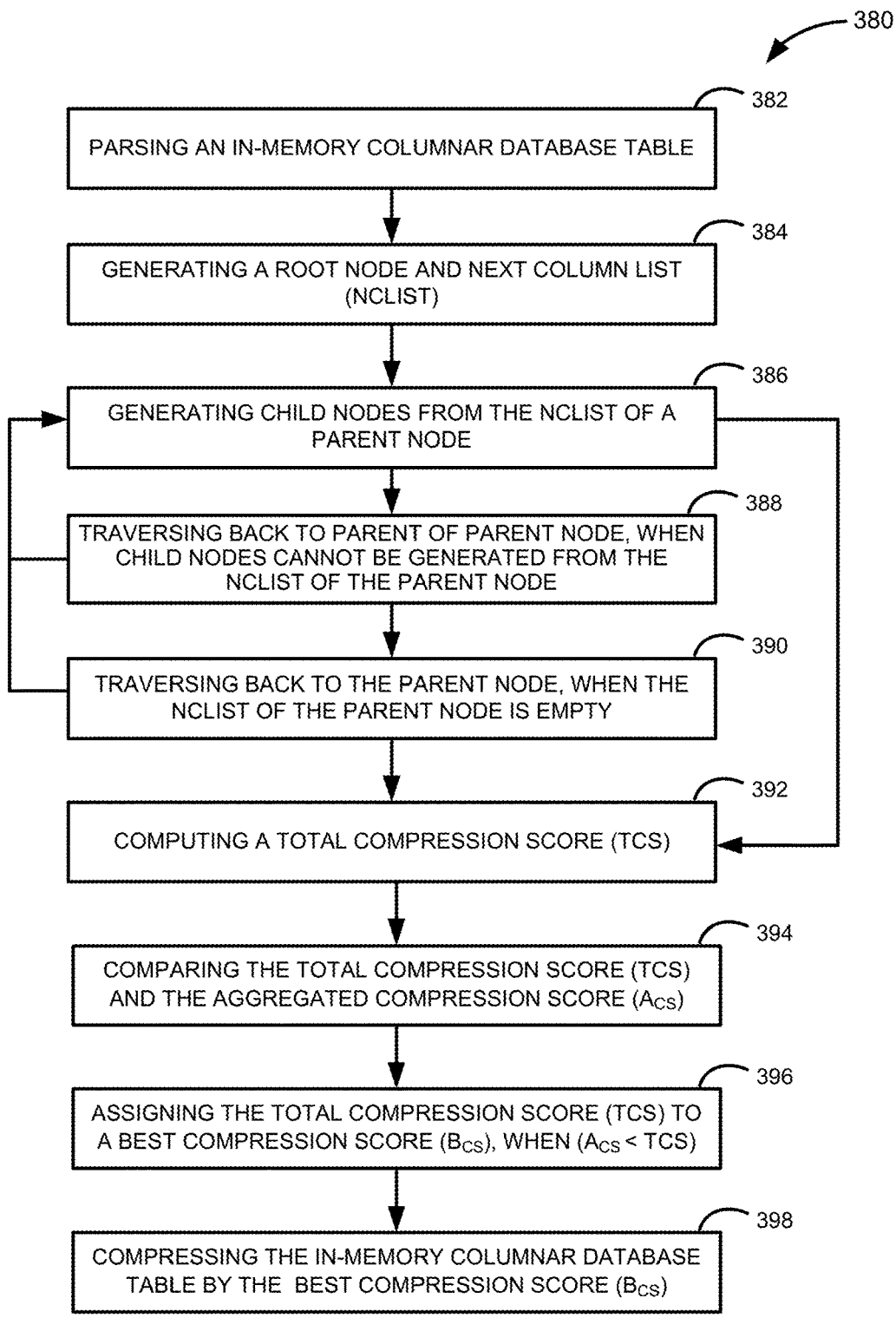
FIG. 3C is a flow diagram illustrating computation of a best compression score for 'table-A' of FIG. 3A, to optimize 'table-A' compression, according to one embodiment.

Child nodes based on the $\text{NCList}_{node360(2,3)}$ set items are generated from the node 360 (2, 3) such as node 364 (1, 1), as shown in FIG. 3C. Nodes with $\text{NCList}_{node360(2,3)}$ set items (2, 1) and (0, 1) are not generated. Since, value-ids '2' and '0' has a maximum number of occurrences, '1' times in the third column, with respect to the value-ids '2' and '3' already selected in the second column and first column of the 'table-A'. These two value-ids may not be helpful in computing the aggregated compression score ($A_{CS}$) greater than the value-ids '2' and '1' that has a maximum number of occurrences, '3' and '2' times respectively. Using equation (eq. 2, shown in paragraph [0042]), the projected compression score (PCS) is determined, whether to generate nodes with the $\text{NCList}_{node360(2,3)}$ set items {(1, 1), (2, 1) (0, 1)}. For example, $PCS_{(1,1)}=((6+1)+(3-3)*0.2*1)=7$; $PCS_{(2,1)}=((6+1)+(3-2)*0.2*1)=7$; and $PCS_{(0,1)}=((6+1)+(3-2)*0.2*1)$ =7. Since, the projected compression scores ($PCS_{(1,1)}$, $PCS_{(1,1)}$ and $PCS_{(0,1)}$) are identical, therefore, generation of only one node, e.g. node 364 (1, 1) may be appropriate. Generation of nodes with the $NCList_{node390(2,3)}$ set items (2, 1) and (0, 1) are avoided. This helps in pruning the tree 350. Node 364 (1, 1) is a third level node generated in the tree 350 with node 390 (2, 3) and node 354 (3, 8) already traversed at the second level and first level.

The solution vector traverses to node 364 (1, 1) from node 360 (2, 3). The compression score (CS) is computed as, $CS_{node364(1,1)}=0$, when the maximum number of occurrences of a particular value-id is '1' times or less than '2' times, then '0' may be used with respect to that value-id in the column to compute the compression score (CS). Since, value-id '1' has a maximum number of occurrences, '1' times, therefore, '0' is used to compute the $CS_{node364(1,1)}$. In 'table-A', there does not exists a column subsequent to the third column, the aggregated compression score ($A_{CS}$) may be computed using the following equation (eq. 3):

$$CS_i = \Sigma_{j=1}^{i}(O_j-2), \text{ where } i>1 \text{ and } CS_0=0 \qquad \text{eq. 3}$$

where,

'i' & 'j' represent index for columns of the given columnar database 'table-A';

$O_i$ is maximum number of occurrences of value-id in $i^{th}$ column corresponding to value-id selected in the previous column;

$O_j$ is number of occurrence of value-id in $j^{th}$ column corresponding to value-id selected in the previous column;

$CS_i$ is total compression score calculated as summation of occurrences of selected value-ids till $i^{th}$ column.

The reason behind subtracting '2' from the $O_i$ is that, a first memory unit required to retain at least one instance of the value-id in the in-memory columnar database table and a second memory unit required to store the maximum occurrence of the value-id. Therefore, '2' memory units are subtracted from the $O_i$.

The aggregated compression score ($A_{CS}$) is computed based on the nodes traversed by the solution vector or the nodal path (node 354 (3, 8), node 360 (2, 3) and node 364 (1, 1)). $A_{CS}=(CS_{node354(3,8)}+CS_{node360(2,3)}+CS_{node364(1,1)})=(6+1+0)='7'$. The aggregated compression score ($A_{CS}$) may be assigned to best compression score ($B_{CS}$), i.e. ($B_{CS}=7$), and stored in memory. In another embodiment, the aggregated compression score ($A_{CS}$) may be computed at each level when the nodes are generated. For example, when node 354 (3, 8) is generated at the first level, $A_{CSnode354(3,8)}=(8-2)='6'$. When node 360 (2, 3) is generated at the second level, $A_{CSnode360(2,3)}=((8-2)+(3-2))='7'$. When node 364 (1, 1) is generated at the third level, $A_{CSnode364(1,1)}=((8-2)+(3-2)+0)='7'$.

The best compression score ($B_{CS}$) may be further used to prune the tree 350. Also, avoid generation of unwanted nodes that may not result in computing aggregated compression score ($A_{CS}$) greater than the best compression score ($B_{CS}=7$). The solution vector traverses the tree 350 back and forth to determine or build a nodal path that may provide the aggregated compression score ($A_{CS}$) greater than the best compression score ($B_{CS}=7$). The solution vector traverse back to node 360 (2, 3) from node 364 (1, 1) to check for untraversed child nodes. As shown in FIG. 3C, since, node 360 (2, 3) does not have child nodes other than node 364 (1, 1), the solution vector traverses back to node 354 (3, 8) from node 350 (2, 3). This to check for untraversed child nodes of node 354 (3, 8) other than the node 360 (2, 3). The solution vector traverses to the node 362 (1, 2) from the node 354 (3, 8). The projected compression score ($PCS_{node362(1,2)}$) may be computed to determine whether to generate child nodes from the node 362 (1, 2). Using equation (eq. 2, shown in paragraph [0042]), $PCS_{node362(1,2)}=(6+(3-2)*0.2*2)='6.4'$, when compared the $PCS_{node362(1,2)}$ is determined to be less than the best compression score ($B_{CS}=7$). Therefore, generation of child nodes from the node 362 (1, 2) are avoided, and the solution vector traverses back to the node 354 (3, 8). As the solution vector already traversed the child nodes, i.e. node 360 (2, 3) and node 362 (1, 2) of the node 354 (3, 8), the solution vector traverses back to the root node 352. This is to check for untraversed child nodes of the root node 352. Based on the $NCList_{rootnode352}$, it may be found that the root node 352 has two untraversed child nodes, e.g. node 356 (1, 7) and node 358 (0, 3). The solution vector may choose to traverse to the node 356 (1, 7) rather than the node 358 (0, 3), since, value-id '1' has a maximum number of occurrences, '7' times greater than the value-id '0' that has maximum number of occurrences, '3' times, i.e. (7>3) in the first column of the 'table-A'. In addition, value-id '1' has a maximum number of occurrences, '7' times closest to the maximum number of occurrences, '8' times of the value-id '3' in the first column. The compression score (CS) may be computed by applying the formula, CS=(maximum number of occurrences of the dominant value-id in a particular column-2). The compression score (CS) for node 356 (1, 7) may be computed, $CS_{node356(1,7)}=(7-2)='5'$.

Based on the $NCList_{node356(1,7)}$ set items {(4, 6), (1, 1)}, child nodes for the node 356 (1, 7) may be generated such as node 366 (4, 6), as shown in FIG. 3C. Node with the $NCList_{node356(1,7)}$ set item (1, 1) may not be generated. Since, maximum number of occurrences of the value-ids '1' is '1' times in the second column of the 'table-A'. This value-id may not be helpful in computing the aggregated compression score ($A_{CS}$) greater than the best compression score ($B_{CS}=7$). Using equation (eq. 2, shown in paragraph [0042]), the projected compression score (PCS) is determined, whether to generate nodes with the $NCList_{node356(1,7)}$ set items {(4, 6), (1, 1)}. For example, $PCS_{(4,6)}=(5+(3-2)*0.2*6)=6.2$; and $PCS_{(1,1)}=(5+(3-2)*0.2*1)=5.2$. Since, the projected compression score ($PCS_{(4,6)}$) is greater than the projected compression score ($PCS_{(1,1)}$) and closest to the best compression score ($B_{CS}=7$), therefore, generation of nodes with the $NCList_{node356(1,7)}$ set item (1, 1) is not generated. This helps in pruning the tree 350. For example, node 366 (4, 6) is generated at the second level from the node 356 (1, 7) selected at the first level in the tree 350.

The solution vector traverses to the node 366 (4, 6). The $NCList_{node366(4,6)}$ include set items {(2, 5), (0, 1)}. The compression score (CS) may be computed as $CS_{node396(4,6)}=(6-2)='4'$. Based on the $NCList_{node366(4,6)}$ set items {(2, 5), (0, 1)}, child nodes from the node 366 (4, 6) may be generated such as node 368 (2, 5). Node with the $NCList_{node356(1,7)}$ set item (0, 1) may not be generated, as the value-id '0' has maximum number of occurrences, '1' times in the third column of the 'table-A'. This value-id may not be helpful in computing the aggregated compression score ($A_{CS}$) greater than the best compression score ($B_{CS}=7$). Using equation (eq. 3, shown in paragraph [0051]), the projected compression score (PCS) is determined, whether to generate nodes with the $NCList_{node396(4,6)}$ set items {(2, 5), (0, 1)}. For example, $PCS_{(2,5)}=((5+4)+(3-3)*0.2*5)=9$; and $PCS_{(1,1)}=((5+4)+(3-3)*0.2*5)=9$. Since, the projected compression score ($PCS_{(4,6)}$) are identical but value-id '2' has a maximum number of occurrences, '5' times that is greater than the maximum number of occurrences, '1' times of the value-id '0', i.e. (5>1). Therefore, generation of nodes with the $NCList_{node366(4,6)}$ set item (0, 1) is avoided. This helps in pruning the tree 380. For example, node 368 (2, 5) is generated at the third level from the node 366 (4, 6) and node 356 (1, 7) selected at the second level and first level in the tree 350.

The solution vector traverses to the node 368 (2, 5). The compression score (CS) may be computed by applying the formula, CS=(maximum number of occurrences of the dominant value-id in a particular column−2). The compression score (CS) for node 368 (2, 5) may be computed, $CS_{node368(2,5)}=(5-2)=3$. In 'table-A', there does not exists a column subsequent to the third column, the aggregated compression score ($A_{CS}$) may be computed using equation (eq. 3, as shown in paragraph [0051]) for the nodes traversed by the solution vector or the nodal path (node 356 (1, 7), node 366 (4, 6) and node 368 (2, 5)). $A_{CS}=(CS_{node356(1,7)}+ CS_{node366(4,6)}+CS_{node368(2,5)})=(5+4+3)=12$. Comparing the aggregated compression score ($A_{CS}=12$) with the best compression score ($B_{CS}=7$). The process of iteratively generating nodes in the tree 350 may be stopped at this point of time. Since, the aggregated compression score ($A_{CS}=12$) is greater than the best compression score ($B_{CS}=7$), the aggregated compression score ($A_{CS}$) is assigned to the best compression score ($B_{CS}$), i.e. ($B_{CS}=12$).

In one embodiment, the best compression score ($B_{CS}=12$) for 'table-A' 302 may be computed using branch and bound approach in combination with prefix length encoding approach and greedy approach. When generating the tree 350, branch and bound approach helps in pruning the tree 350 by avoiding generation of unwanted nodes. As a result, computation of a low valued best compression score ($B_{CS}$) than the previously computed best compression score (($B_{CSprevious}=7$) is avoided. Therefore, pruning the tree 350 using the branch and bound, reduces computation time to compute the best compression score ($B_{CS}=12$) that is greater than the previously computed best compression score (($B_{CSprevious}=7$). As a result, this also reduces memory consumption to store the tree 350 due to lesser number of nodes and also improves in-memory search response time.

In one embodiment, a maximum number of best compression scores ($B_{CS}$) to be computed iteratively for the given in-memory columnar database table, may be either automatically or manually set by administrator. In one exemplary embodiment, when compared with the tree 250, as shown in FIG. 2B, tree 350 is generated with only 9 nodes (including the root node). Due to lesser number of nodes, traversing the nodes 352 to 368 in the tree 350 is easier than traversing the nodes in the tree 250. The tree 350 may be managed and comparatively require less memory for storage due to lesser number nodes. Therefore, the in-memory columnar database table may be compressed by the best compression score ($B_{CS}$). For example, the total memory units (M) required to store 'table-A' is computed as total number of records in each column minus the best compression score ($B_{CS}$). Since, 'Table-A' includes '23' records in each columns and best compression score ($B_{CS}=12$), the total memory units (M), M=((23*3)−12)='57'. Initially, '69' (23*3) memory units is required to store 'table-A' is reduced to '57' memory units. Therefore, the overall 'table-A' compression is improved or optimized.

FIG. 3C is a flow diagram 380 illustrating computation of a best compression score for 'table-A' of FIG. 3A, to optimize 'table-A' compression, according to one embodiment. The in-memory columnar database table, e.g. 'table-A', as shown in FIG. 3A, includes '23' records in three columns. A process when executed based on the flow diagram 380, generates a tree based on the records of 'table-A' and computes an aggregated compression score ($A_{CS}$) that optimizes overall 'table-A' compression. The tree includes multiple nodes and each node represents a set of information such as occurrence of a value-id of a particular column; maximum number of occurrences of the value-id in that column; and a next column (NCList) list corresponding to value-id selected in the previous column of the given database table. In addition, each node in the tree includes a child pointer and parent pointer that helps in traversing the tree.

At block 382, an in-memory columnar database table, e.g. 'table-A' is parsed to compute a total compression score greater than an aggregated compression score ($A_{CS}$). The aggregated compression score ($A_{CS}=7$) is computed using value-id '3' that has maximum number of occurrences, '8' times in a first column of the 'table-A'. The aggregated compression score ($A_{CS}=7$) is stored in the memory using prefix length encoding approach in combination with greedy approach corresponding to 'table-A'. The aggregated compression score ($A_{CS}=7$) is read from the memory when the 'table-A' is parsed.

Next, at 384, a root node is generated with value-id null and maximum number of occurrences as null. The NCList for the root node is generated based on the records in the first column. Next at 386, child nodes are generated from NCList of a parent node. Once the child nodes are generated, NCList of the child nodes are also generated. The NCList of the child node information of value-ids and its' maximum number of occurrences in the subsequent column corresponding to the value-id of the parent node, i.e. value-id selected in the present column of 'table-A'.

At 388, when child nodes cannot be generated from the NCList of parent node then traverse back to parent of parent node. To accomplish this, block 386 may be executed iteratively and satisfies a condition that when no child node can be generated from the parent node, the iterative loop exits. The parent pointer of the child node and the child pointer of the parent node helps in traversing the tree. At 390, when NCList of a child node is empty, then traverse back to the parent node. To accomplish this, block 386 to 390 may be executed iteratively. The parent pointer of the child node and the child pointer of the parent node helps in traversing the tree. A compression score may be computed for each node selected that is representing value-id from one of the column of the database table. For example, node (1, 7) may be selected, since, the value-id '1' that has a maximum number of occurrences, '7' times is closest to the maximum number of occurrences, '8' of the value-id '3' in the first column. The compression score for node (1, 7) is '5' (7−2). When the value-id '1' is selected in the first column, value-ids '4' and '2' may be selected in the subsequent columns such as second column and third column respectively. The compression score for node (4, 6) is '4' (6−2) and the compression score for node (2, 5) is '3' (5−2).

At block 392, a total compression score (TCS) is computed by aggregating number of occurrences of a value-id in each column of the in-memory columnar database table. The total compression score is computed for a selected nodal path that represents a combination of nodes in the tree. The total compression score (TCS) may be calculated using following equation (eq. 3, as shown in paragraph [0051]). For example, the total compression score (CS) may be computed for a set (S) of value-ids and its maximum number of occurrences selected in a first column, second column and third column of 'table-A'. S={(1, 7), (4, 6), (2, 5)}, CS= ((7−2)+(6−2)+(5−2))=(5+4+3)=12. The set (S) may also represents a particular nodal path in the tree. When the maximum number of occurrences of a value-id is '1' times in a given column, occurrence count is assumed to be zero while computing the total compression score (TCS). For example, if, S={={(1, 7), (4, 6), (0, 1)}, CS=((7−2)+(6−2)+(0))=(5+4+0)=9. Since, value-id '0' has a maximum number of occurrences '1' times in the third column with respect to the value-id '4' and value-id '1' selected in the second column and the first column respectively.

At 394, the total compression score (CS) is compared with the aggregated compression score (Acs) of the 'table-A'. Blocks 384 to 394 may be executed iteratively till the total compression score (TCS) is greater than the aggregated compression score (Acs) is determined. Next at block 396, when the aggregated compression score ($A_{CS}$=7) is less than the total compression score (TCS=12), i.e. (7<12), the total compression score (CS) is assigned to the best compression score ($B_{CS}$), i.e. ($B_{CS}$=12). Next, at block 398, when the best compression score ($B_{CS}$) is computed, 'table-A' may be compressed by the best compression score ($B_{CS}$=12). Therefore, the best compression score ($B_{CS}$=12) is able to optimize 'table-A' compression than the aggregated compression score ($A_{CS}$=7).

In one embodiment, the aggregated compression score ($A_{CS}$=7) may be computed and stored in the memory when the process 380 is executed for the first time. To prune the tree, generation of few nodes are avoided by determining a projected compression score (PCS) for NCList set items using equation (eq. 2, as shown in paragraph [0042]). As a result the tree is built with lesser number of nodes. For example, assuming that 'table-A' includes 23 set of records in three columns, the tree is generated without considering the projected compression score (PCS) may include 36 nodes, as shown in FIG. 2B. When the projected compression score (PCS) determined for each NCList set items of a particular node, the tree is built with only 9 nodes. This reduces number of nodes from being generated in the tree and improves efficiency of the process to compute the best compression score ($B_{CS}$). A total memory required to store the columnar database table is compressed by reducing the best compression score ($B_{CS}$). As a result, in-memory columnar database table compression is improved/optimized.

Figure 4:
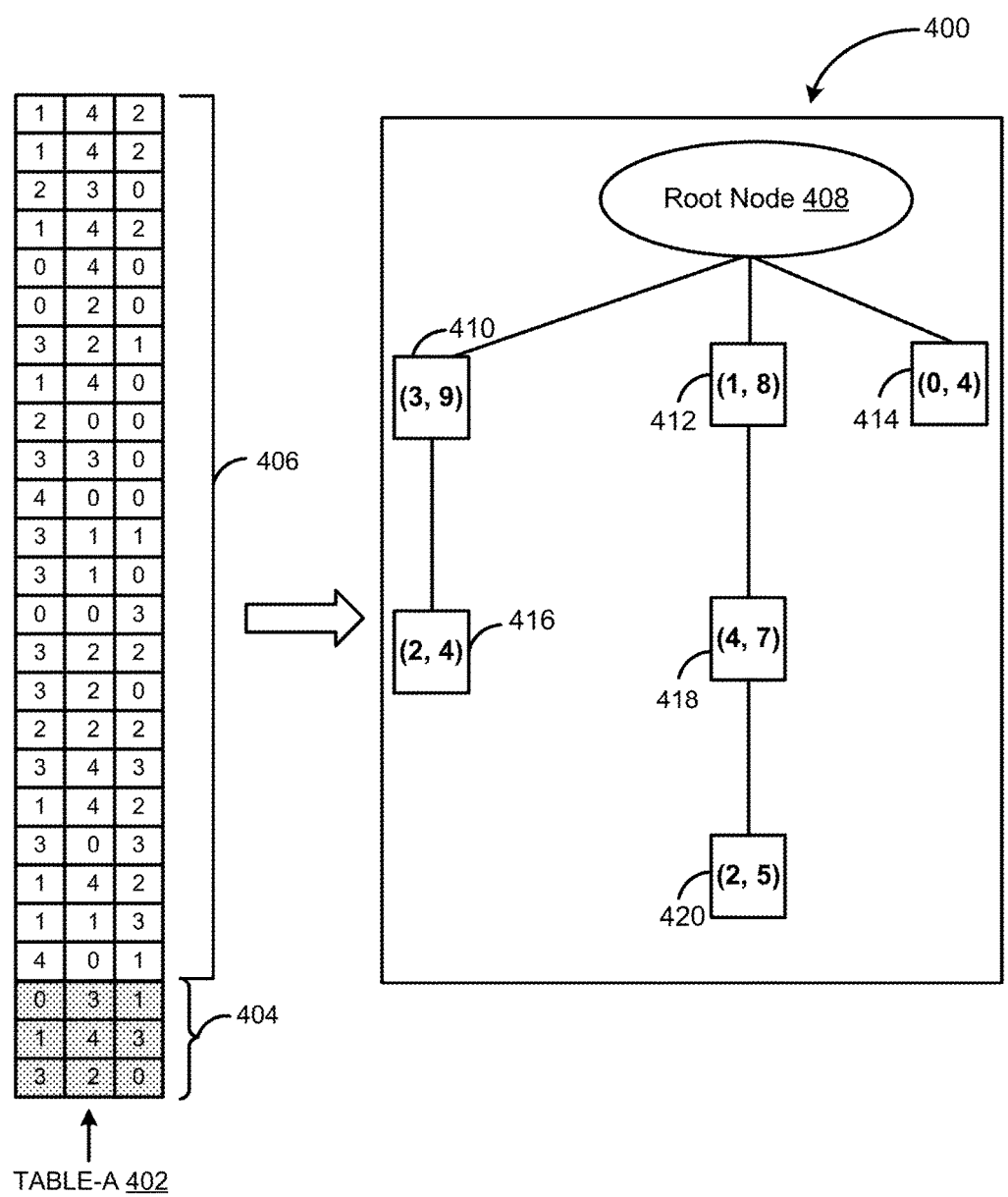
FIG. 4 is an exemplary graphical representation illustrating a tree generated when new records are appended in an in-memory columnar database table compute a best compression score for optimizing in-memory column based database table compression, according to one embodiment.

FIG. 4 is an exemplary graphical representation illustrating a tree 400 generated when new records are appended in an in-memory columnar database table and a best compression score is computed for optimizing in-memory column based database table compression, according to one embodiment. In an exemplary embodiment, 'table-A' 402 include three columns, arranged from left to right, such as first column, second column and third column. The 'table-A' 402 may be an in-memory columnar database table including '23' records in each columns. Best compression score ($B_{CS}$) may be computed as '12', as described in FIG. 3A. The best compression score ($B_{CS}$=12) may be computed upon selection of value-ids '1', '4', and '2' in the first column, second column and third column, respectively of the 'table-A' 402. As shown in the FIG. 4, new records 404 are appended to the existing '23' records 406 of 'table-A' 402. Based on the nodes generated in the tree 400, an aggregated compression score ($A_{CS}$) may be computed that will optimize 'table-A' compression including the newly appended records 404. The tree 400 is generated to check whether the newly appended records 404 have increased the maximum number of occurrences value-ids in particular column of 'table-A'. If yes, the tree 400 attempt to compute an aggregated compression score ($A_{CS}$) greater than the best compression score ($B_{CS}$=12).

The tree 400 include root node and branch nodes, generated based on the value-ids in the columns of the 'table-A' 402. The root node and the branch nodes are referred to as nodes. When a node is generated in a tree 400, it includes a child pointer and parent pointer that helps in traversing the tree 400 easily. Solution vector may be initialized to build and traverse the tree 400. The solution vector also keeps track of the nodes traversed in a particular nodal path or in a branch. Each of the nodes in the tree 400 represents a set of information such as a value-id selected from a particular column; maximum number of occurrences of the value-id in that column; a next column list (NCList). The NCList (not shown in FIG. 4) is a list of value-ids and its maximum number of occurrences in a subsequent column with respect to a selected value-id in previous column. The NCList may be represented as (value-id, its maximum number of occurrences in a particular column). For example, (3, 9) i.e. value-id '3' has maximum of number of occurrences, '9' times in first column.

At first, a root node 408 is generated and value-ids in the first column of the 'table-A' 402 is scanned and sorted. The solution vector traverses to the root node 408. For the root node 408, the value-id is null and maximum number of occurrences value-id is null. $NCList_{rootnode408}$ is generated and include set items {(3, 9), (1, 8), (0, 4), (2, 2), (4, 2)}. Child nodes based on the maximum number of occurrences of the value-ids in the first column are generated such as node 410 (3, 9), node 412 (1, 8), and node 414 (0, 4). Nodes with $NCList_{rootnode408}$ set items (2, 2) and (4, 2) are not generated. Since, value-ids '2' and '4' has a maximum number of occurrences '2' times in the first column of the 'table-A' 402. These two value-ids may not be helpful in computing the aggregated compression score ($A_{CS}$) than the best compression score ($B_{CS}$=12). Using equation (eq. 2, as shown in paragraph [0042]), a projected compression score (PCS) is determined, whether to generate nodes with the $NCList_{rootnode408}$ set items {(3, 9), (1, 8), (0, 4), (2, 2), (4, 2)}. For example, $PCS_{(3, 9)}$=(0+(3−1)*0.2*9)=3.6; $PCS_{(1, 8)}$=(0+(3−1)*0.2*8)=3.2; $PCS_{(0, 4)}$=(0+(3−1)*0.2*4)= 1.6; $PCS_{(2, 2)}$=(0+(3−1)*0.2*2)=0.8; $PCS_{(4,2)}$=(0+(3−1)*0.2*2)=0.8. (T=0.2), may be set by the administrator. Since, the projected compression scores ($PCS_{(2,2)}$ and $PCS_{(4,2)}$) are comparatively very less than the projected compression scores ($PCS_{(3,9)}$, $PCS_{(1,8)}$ and $PCS_{(0,4)}$), therefore, generation of nodes with the $NCList_{rootnode382}$ set items (2, 2) and (4, 2) are avoided. This helps in pruning the tree 406.

NCLists' for the node 410 (3, 9), node 412 (1, 8), and node 414 (0, 4) are generated based on value-ids and maximum number of occurrences in the second column of the 'table A' 402. For example, $NCList_{node410(3,9)}$ include set items {(2, 4), (1, 2), (3, 1), (4, 1), (0, 1)}, when value-id '3' that has a maximum number of occurrences, '9' times, is selected in the first column of the 'table-A' 402. $NCList_{node412(1,8)}$ include set items {(4, 7), (1, 1)}, when value-id '1' is selected in the first column, that has a maximum number of occurrences, '8' times. $NCList_{node414(0,4)}$ include set items {(0, 1), (2, 1), (4, 1), (3, 1)}, when value-id '0' selected in the first column, that has a maximum number of occurrences, '4' times.

The solution vector traverses to the node 410 (3, 9), since, when compared with the node 412 (1, 8), the value-id '3' has a maximum number of occurrences closest to the maximum number of occurrences, '9' times of the value-id '3' in the first column. In addition, the projected compression score (PCS) of the $NCList_{node410(3,9)}$ set item (3, 9) is greater than the other set items (1, 8) and (0, 4). A compression score (CS) may be computed for the node 410 (3, 9). The compression score (CS) is computed by subtracting '2' memory units from the maximum number of occurrences of the value-id. Currently, the solution vector traverses to the node 410 (3, 9). The compression score (CS) may be computed by applying the formula, CS=(maximum number of occurrences of the dominant value-id in a particular column–2). The compression score (CS) for node 410 (3, 9) may be computed, $CS_{node410(3,9)}=(9-2)=7$.

Child nodes based on the $NCList_{node410(3,9)}$ set items are generated from the node 410 (3, 9) such as node 416 (2, 4), as shown in FIG. 4. Nodes with $NCList_{node410(3,9)}$ set items (1, 2), (3, 1), (4, 1) and (0, 1) are not generated. Since, valued '1' has a maximum number of occurrences, '2' times and value-ids '3', '4' and '0' has a maximum number of occurrences, '1' times in the second column, with respect to the value-id '3' already selected in the first column of the 'table-A' 402. These three value-ids may not be helpful in computing the aggregated compression score ($A_{CS}$) greater than the best compression score ($B_{CS}=12$). Using equation (eq. 2, shown in paragraph [0042]), the projected compression score (PCS) is determined, whether to generate nodes with the $NCList_{node410(3,9)}$ set items {(2, 4), (1, 2), (3, 1), (4, 1), (0, 1)}. For example, $PCS_{(2,4)}=(7+(3-2)*0.2*3)=7.6$; $PCS_{(1,2)}=(7+(3-2)*0.2*2)=7.4$; $PCS_{(3,1)}=(7+(3-2)*0.2*1)=7.2$; $PCS_{(4,1)}=(7+(3-2)*0.2*1)=7.2$; $PCS_{(0,1)}=(7+(3-2)*0.2*1)=7.2$. Since, the projected compression scores ($PCS_{(1,2)}$, $PCS_{(3,1)}$, $PCS_{(4,1)}$ and $PCS_{(0,1)}$) are identical and comparatively less than the projected compression scores ($PCS_{(2,4)}$), therefore, generation of nodes with the $NCList_{node410(3,9)}$ set items (1, 2), (3, 1), (4, 1) and (0, 1) are avoided. This helps in pruning the tree 400. Node 416 (2, 4) is generated in the tree 400 with node 410 (3, 9) is already traversed by the solution vector.

The solution vector traverses to the node 416 (2, 4) and $NCList_{node416(2,4)}$ with set items {(1, 1), (2, 1), (0, 2)} is generated. Using equation (eq. 2, as shown in paragraph [0042]), the projected compression score (PCS) is determined, whether to generate nodes with the $NCList_{node416(2,4)}$ set items {(1, 1), (2, 1), (0, 2)}. For example, $PCS_{(1,1)}=((7+2)+(3-3)*0.2*1)=9$; $PCS_{(2,1)}=((7+2)+(3-2)*0.2*1)=9$; and $PCS_{(0,1)}=((7+2)+(3-2)*0.2*2)=9$. When the best compression score ($B_{CS}=12$), the projected compression scores ($PCS_{(1,1)}$, $PCS_{(2,1)}$ and $PCS_{(0,2)}$) are comparatively less. Therefore, nodes with $NCList_{node416(2,4)}$ with set items {(1, 1), (2, 1), (0, 2)} are not generated, as this may not be helpful in computing the aggregated compression score ($A_{CS}$) greater than the best compression score ($B_{CS}=12$). The solution vector traverses back to the node 410 (3, 9) to check for untraversed child nodes. Since, the node 410 (3, 9) does not have child nodes other than the node 416 (2, 4), the solution vector traverses back to the root node 408. The root node 408 has untraversed child nodes such as node 412 (1, 8) and node 414 (0, 4), the solution vector traverses to the node 412 (1, 8). The value-id '1' has a maximum number of occurrences, '8' times, that is greater than the value-id '0', i.e. (8>4). $NCList_{node412(1,8)}$ with set items {(4, 7), (1, 1)} is generated, based on the value-ids in the second column corresponding to value-id '1' already selected in the first column. The compression score (CS) may be computed using equation (eq. 3, as shown in paragraph [0051]), $CS_{node412(1,8)}=(8-2)=6$.

Based on the $NCList_{node412(1,8)}$, child nodes for the node 412 (1, 8) may be generated such as node 418 (4, 7), as shown in FIG. 4. Node with the $NCList_{node412(1,8)}$ set item (1, 1) may not be generated. Since, maximum number of occurrences of the value-ids '1' is '1' in the second column of the 'table-A' 402. This value-id may not be helpful in computing the aggregated compression score ($A_{CS}$) greater than the best compression score ($B_{CS}=12$). Using equation (eq. 2, as shown in paragraph [0042]), the projected compression score (PCS) is determined, whether to generate nodes with the $NCList_{node412(1,8)}$ set items {(4, 7), (1, 1)}. For example, $PCS_{(4,7)}=(6+(3-2)*0.2*7)=7.4$; and $PCS_{(1,1)}=(6+(3-2)*0.2*1)=6.2$. Since, the projected compression score ($PCS_{(4,7)}$) is greater than the projected compression score ($PCS_{(1,1)}$), therefore, generation of nodes with the $NCList_{node412(1,8)}$) set item (1, 1) is avoided. This helps in pruning the tree 400. For example, node 418 (4, 7) is generated and node 412 (1, 8) is already traversed by the solution vector.

The solution vector traverses to the node 418 (4, 7). The $NCList_{node412(4,7)}$ include set items {(2, 5), (0, 1), (3, 1)}. The compression score (CS) may be computed using equation (eq. 3, as shown in paragraph [0051]), $CS_{node418(4,7)}=(7-2)=5$. Based on the $NCList_{node418(4,7)}$ set items {(2, 5), (0, 1), (3, 1)}, child nodes from the node 418 (4, 7) may be generated such as node 420 (2, 5). Nodes with $NCList_{node418(4,7)}$ set item (0, 1) and (3, 1) may not be generated, as the value-ids '0' and '3' has a maximum number of occurrences, '1' times in the third column of the 'table-A' 402. These value-id may not be helpful in computing the aggregated compression score ($A_{CS}$) greater than the best compression score ($B_{CS}=12$). Using equation (eq. 3, shown in paragraph [0051]), the projected compression score (PCS) is determined, whether to generate nodes with the $NCList_{node418(4,7)}$ set items {(2, 5), (0, 1), (3, 1)}. For example, $PCS_{(2,5)}=((6+5)+(3-3)*0.2*5)=11$; $PCS_{(1,1)}=((6+5)+(3-3)*0.2*5)=11$; and $PCS_{(3,1)}=((6+5)+(3-3)*0.2*5)=11$. Since, the projected compression score ($PCS_{(4,6)}$) are identical but value-id '2' has a maximum number of occurrences, '5' times, that is greater than the value-ids '0' and '3' that has a maximum number of occurrences, '1' times in the third column, i.e. (5>1). Therefore, generation of nodes with $NCList_{node418(4,7)}$ set item (0, 1) and (3, 1) are avoided. This further helps in pruning the tree 400.

The solution vector traverses to the node 420 (2, 5). The compression score (CS) may be computed by applying the formula, CS=(maximum number of occurrences of the dominant value-id in a particular column–2). The compression score (CS) for node 420 (2, 5) may computed, $CS_{node420(2,5)}=(5-2)=3$. In 'table-A' 402, there does not exists a column subsequent to the third column, the aggregated compression score (Acs) may be computed using equation (eq. 2, as shown in paragraph [0042]) for the nodes traversed by the solution vector or the nodal path (node 412 (1, 8), node 418 (4, 7) and node 420 (2, 5)). $A_{CS}=CS_{node412(1,8)}+CS_{node418(4,7)}+CS_{node420(2,5)})$ (6+5+3)=14. Comparing the aggregated compression score ($A_{CS}=14$) with the best compression score ($B_{CS}=12$). The process of iteratively generating nodes in the tree 400 may be stopped at this point of time. Since, the aggregated compression score ($A_{CS}$) is greater than the best compression score ($B_{CS}$), the newly computed aggregated compression score ($A_{CS}$) is assigned to best compression score ($B_{CS}$), i.e. ($B_{CS}=14$).

In one exemplary embodiment, as shown in FIG. 3B, tree is generated with 9 nodes for a table that has '23' records in each of the three columns whereas tree 400 is generated with 7 nodes for the 'table-A'. 'Table-A' has '26' records including the newly appended records 404 in each of the three columns. This improves the efficiency of the process to determine and compute the best compression score ($B_{CS}$) in less time. Initially, memory units required by the 'Table-A' 402 to store '26' records in three columns is '78' (26+26+

26). However, 'Table-A' 402 may be compressed by the best compression score ($B_{CS}$). If the 'Table-A' 402 is compressed by the previous best compression score ($B_{CSprevious}$=12), then the 'Table-A' 402 may require '66' (78−12) memory units for storage. When the 'Table-A' 402 is compressed by the newly computed best compression score ($B_{CS}$=14), it requires '64' (78−14) memory units for the storage. Therefore, the overall 'table-A' compression is optimized by the best compression score ($B_{CS}$=14).

FIG. 5 is an exemplary block diagram 500 illustrating records when a best compression score is computed to optimize in-memory column based database table compression over a given time period, according to one embodiment. In an exemplary embodiment, execution of process to compute the best compression score ($B_{CS}$) for a given columnar database table, block diagram 500 is generated and updated. The block diagram 500 may be represented in the form of table. The table shows records when the best compression score ($B_{CS}$) is either found or not found over the given time period. The table may include columns such as execution no. 502, table identifier 504, optimal bit 506, and compression score 508. The execution no. 502 represent records related to number of times the process to compute the best compression score ($B_{CS}$) is executed. For example, as shown in execution no. 502, the method may be executed five times in the given time period. Table identifier 504 represents unique table identity (id) to identify a database table stored in a memory. The optimal bit 506 represented with either '0' or '1'. When the best compression score ($B_{CS}$) is found in a particular execution of the process, optimal bit 506 is updated with '1'. When the best compression score ($B_{CS}$) is not found in a particular execution of the process, then the optimal bit 506 is updated with '0'. When the process to compute the best compression score ($B_{CS}$) is aborted without computing an aggregated compression score ($A_{CS}$) greater than the previously computed best compression score ($B_{CS}$), the optimal bit 506 may be represented with '0'. Compression score 508 represents the best compression score ($B_{CS}$) computed during a particular execution of the process. For example, during second time execution of the process to compute the best compression score ($B_{CS}$), records in the columns execution no. 502 indicates '2'. Table identifier 504 indicates 'table id 3', the execution of the process may be aborted without computing the aggregated compression score ($A_{CS}$) greater than the previously computed best compression score ($B_{CS}$), as the optimal bit 506 indicates '0'. Finally, the compression score 508 may indicate score '8' when the process is executed second time for the database table identified by 'table id 3'.

Figure 6:
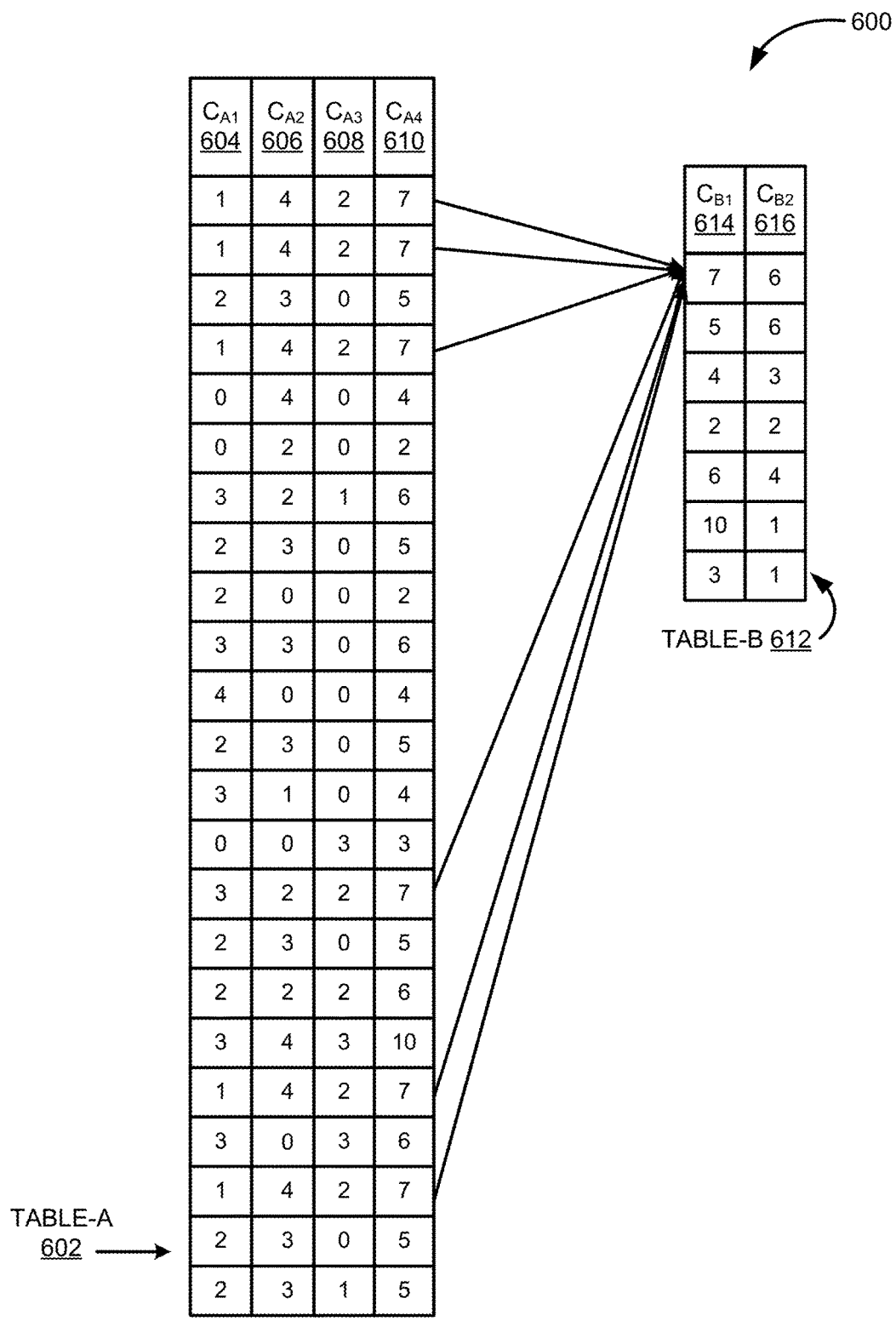
FIG. 6 is an exemplary block diagram illustrating a column sum approach to compute a best compression score to optimize in-memory column based database table compression, according to one embodiment.

FIG. 6 is an exemplary block diagram 600 illustrating a column sum approach to compute a best compression score to optimize in-memory column based database table compression, according to one embodiment. Initially, 'table-A' 602 include three columns such as '$C_{A1}$' 604, '$C_{A2}$' 606, '$C_{A3}$' 608. Column '$C_{A4}$' 610 may be generated for the 'table-A' 602 and is populated with value-ids obtained by adding the value-ids across the columns '$C_{A1}$' 604, '$C_{A2}$' 606, and '$C_{A3}$' 608. For example, first row of the 'table-A' 602 includes value-ids '1', '4' and '2' in columns '$C_{A1}$' 604, '$C_{A2}$' 606, and '$C_{A3}$' 608. The value-id '7' in column '$C_{A4}$' 610 is obtained by adding the value-ids '1', '4' and '2'. To identify dominant value-ids, column '$C_{A4}$' 610 may be scanned and/or sorted. Among the value-ids, a dominant value-id has a maximum number of occurrences in a particular column. Based on the maximum number of occurrences of the value-ids in the column '$C_{A4}$' 610, a database 'table-B' 612 may be generated including columns '$C_{B1}$' 614 and '$C_{B2}$' 616. Column '$C_{B1}$' 614 may represent dominant value-ids from the column '$C_{A4}$' 610 of 'table-A' 602. Column '$C_{B2}$' 616 represents a maximum number of occurrences of a value-id in the column '$C_{A4}$' 610 of 'table-A' 602. For example, first record of 'table-B' 612 includes value-ids '7' and '6' in columns '$C_{B1}$' 614 and '$C_{B2}$' 616 respectively. Value-id '7' in column '$C_{B1}$' 614 represents a dominant value-id from the column '$C_{A4}$' 610 and value-id '6' represents count of maximum number of occurrences of the unique value-id '7' in column '$C_{A4}$' 610 of 'table-A' 602.

According to 'table-A' 612, value-ids '7' and '5' has maximum number of occurrences, '6' times in column '$C_{A4}$' 610. Aggregated compression scores ($A_{CS}$) may be computed with respect to the records in columns '$C_{A1}$' 604, '$C_{A2}$' 606, and '$C_{A3}$' 608 for which value-ids '7' and '5' is obtained in '$C_{A4}$' 610. Remaining of the records of the 'Table-A' 602 may not be scanned, since, maximum number of occurrences of the remaining value-ids are less than the maximum number of occurrences of value-ids '7' and '5' in column '$C_{A4}$' 610, as shown in 'table-B' 612. Set of records in columns '$C_{A1}$' 604, '$C_{A2}$' 606, and '$C_{A3}$' 608 that generate a sum of '7' in '$C_{A4}$' 610 are {(1, 4, 2), (3, 2, 2)}. Set of records in columns '$C_{A1}$' 604, '$C_{A2}$' 606, and '$C_{A3}$' 608 that generate a sum of '5' in '$C_{A4}$' 610 are {(2, 3, 0), (2, 3, 1)}. Therefore, instead of scanning and/or sorting '23' records in the 'table-A' 602, a total of '12' records are scanned, i.e. records that has a sum '7' or '5' in '$C_{A4}$' 610.

To determine a best compression score ($B_{CS}$), an aggregated compression scores ($A_{CS}$) is computed and compared iteratively using equations (eq. 3, as shown in paragraph [0051]). The aggregated compression score ($A_{CS}$) may be computed and compared for only '7' records instead of '23' records in the 'table-A' 602. For example, for record (2, 3, 0) in columns '$C_{A1}$' 604, '$C_{A2}$' 606, and '$C_{A3}$' 608 and has a sum of '5' in column '$C_{A4}$' 610; value-id '2' has maximum number of occurrences, '6' times in column '$C_{A1}$' 604; value-id '3' has maximum number of occurrences, '6' times in column '$C_{A2}$' 606; and value-id '0' has maximum number of occurrences, '5' times in column '$C_{A3}$' 608. The aggregated compression score ($A_{CS}$) may be computed using equation (eq. 3, as shown in paragraph [0051]), $A_{CS(2,3,0)}$=((6−2)+(6−2)+(5−2))=11. Another record (1, 4, 2) in columns '$C_{A1}$' 604, '$C_{A2}$' 606, and '$C_{A3}$' 608 and has a sum of '7' in column '$C_{A4}$' 610; value-id '1' has a maximum number of occurrences, '6' times in column '$C_{A1}$' 604; value-id '4' has a maximum number of occurrences, '6' times in column '$C_{A2}$' 606; and value-id '2' has a maximum number of occurrences, '6' times in column '$C_{A3}$' 608. The aggregated compression score ($A_{CS}$) may be computed using equation (eq. 3, shown in paragraph [0051]), $A_{CS(1,4,2)}$=((6−2)+(6−2)+(6−2))=12. Computed aggregated compression scores ($A_{CS}$) are compared among each other, e.g. ($A_{CS(1,4,2)}$>$A_{CS(2,3,0)}$). The best compression score ($B_{CS}$) may be updated with the aggregated compression score ($A_{CS(1,4,2)}$), i.e. $B_{CS}$=12.

Therefore, the column sum approach is able to compute the best compression score ($B_{CS}$) comparatively in less time. The 'table-A' 602 may be compressed using the best compression score ($B_{CS}$=12), i.e. the memory units required to store the 'table-A' 602 including '23' records in three columns '$C_{A1}$' 604, '$C_{A2}$' 606, and '$C_{A3}$' 608 is '57' (23+23+23−12).

In one embodiment, when the number of records in 'table-B' 612 are in billions, then few dominant value-ids in column '$C_{A4}$' 610 are checked. For example, the administrator may provide instructions to check for top five dominant value-ids in column '$C_{A4}$' 610. Also, 'table-B' may include records that has limited of number dominant value-ids for reusability. The 'table-B' 612 is stored in in-memory database. In one embodiment, the column sum approach may be used in combination with the process, as described in FIG. 3A, to compute the best compression score ($B_{CS}$) for the given database in-memory columnar database table.

Figure 7A:
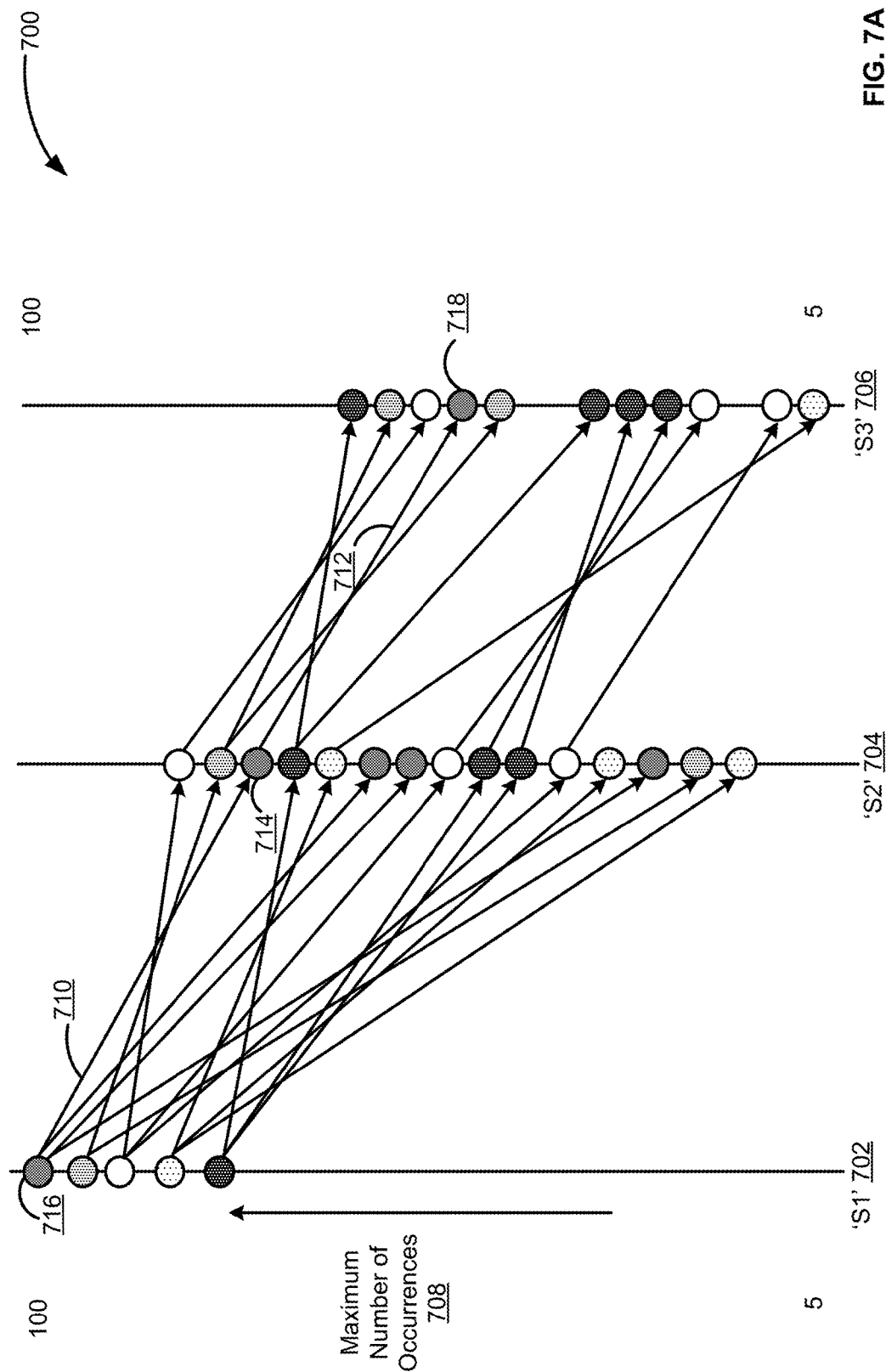
FIG. 7A is an exemplary graphical representation illustrating value-ids that has maximum number of occurrences in an in-memory columnar database table, according to one embodiment.

FIG. 7A is an exemplary graphical representation 700 illustrating value-ids that has maximum number of occurrences in an in-memory columnar database table, according to one embodiment. The graphical representation 700 may be a bubble chart generated based on the in-memory columnar database table, e.g. 'table-A'. Data in the 'table-A' may be represented in form of integers, termed as value-id(s). The 'table-A' may include three columns first column, second column and third column. The graphical representation 700 illustrated parallel coordinates such as 'S1' 702 represents first column, 'S2' 704 represents second column, and 'S3' 706 represents third column of the 'table-A'. The parallel coordinates 'S1' 702, 'S2' 704 and 'S3' 706 illustrate differently shaded bubbles to distinguish different value-ids in a column. The parallel coordinates 'S1' 702, 'S2' 704 and 'S3' 706 shows a maximum limit '100' and a minimum limit '5' indicating maximum number of occurrences of value-ids 708 within a range [5 to 100].

Value-ids are displayed in the form of circular bubbles. Position of the bubbles on the parallel coordinates 'S1' 702, 'S2' 704 and 'S3' 706 represent maximum number of occurrences of the value-ids 708 in the columns. Direction indicator, e.g. 710 and 712 connecting the bubbles across all the parallel coordinates 'S1' 702, 'S2' 704 and 'S3' 706, indicate a record in the given 'table-A'. For example, direction indicator 710 indicates occurrence of value-id, i.e. bubble 714 on parallel coordinate 'S2' 704 with respect to the occurrence of the value-id, i.e. bubble 716 on the parallel coordinate 'S1' 702. In another example, direction indicator 712 indicates occurrence of value-id, i.e. bubble 718 on parallel coordinate 'S3' 706 with respect to the occurrence of the value-id, i.e. bubble 714 on the parallel coordinate 'S2' 704.

In one embodiment, the graphical representation 700 may be an interactive graph, the administrator may be enabled to perform actions such as select, add, modify, and delete parameters. For example, minimum limit to indicate minimum number of occurrence of value-ids; maximum limit to indicate maximum number of occurrences of value-ids; showing records corresponding to a selected set of dominant value-ids from the first column. An aggregated compression score may be computed by aggregating compression scores of each columns of the 'table-A' using equation (eq. 3, as shown in paragraph [0051]). For example, in an in-memory columnar database 'table-A' that includes 100 records, i.e. 100 value-ids in each columns. A first dominant value-id has maximum number of occurrences, '50' times in first column, a second dominant value-id has maximum number of occurrences, '30' times in second column and a third dominant value-id has maximum number of occurrences, '20' times in third column. The total memory units required by the dominant value-ids may be computed as summation of maximum number of occurrences of the first dominant value-id in the first column; maximum number of occurrences of the second dominant value-id in the second column; and maximum number of occurrences of the third dominant value-id in the third column, i.e. 100 (50+30+20). A condition may be satisfied when setting the minimum limit ($L_{MIN}$) for maximum number of occurrences for value-ids displayed in the graphical representation 700. The minimum limit ($L_{MIN-I}$) for the first column of the 'table-A' may be computed by applying the formula, $L_{MIN-I}$=((summation of maximum number of occurrences of dominant value-ids in each columns)/(total number of columns)), and rounding off to the nearest whole number. For example, while selecting a particular value-id in the first column of the 'Table-A', condition to be satisfied is '34' (100/3). As a result, value-ids that has maximum number of occurrences, '34' times or greater than '34' are selected from the first column to be displayed in the graphical representation 700. If a selected value-id has maximum number of occurrences less than '34' times, this may lead to low compression score and eventually a low valued best compression score ($B_{CS}$) for the 'table-A', i.e. less than '100'. Therefore, the minimum limit ($L_{MIN-I}$) may be set as '34' for the parallel coordinate 'S1' 702 in the graphical representation 700 for value-ids to be selected from the first column of 'table-A'.

A minimum limit ($L_{MIN-II}$) for the second column of the given 'table-A' may be computed by satisfying formula, $L_{MIN-II}$=(((summation of maximum number of occurrences of dominant value-ids in each columns)−(maximum number of occurrences of the value-id in a previously selected column))/(remaining number of columns in the database table)+1), and rounding off to the nearest whole integer. '1' is added so that number of occurrences of the value-id to be selected in next subsequent column, e.g. third column, should be less than the number of occurrences in the current column, e.g. second column. For example, in 'table-A', if selected value-id has maximum number of occurrences, '40' times in the first column, then the minimum limit computed for the second column is '31' (((100−40)/2)+1). In one embodiment, construction of the parallel coordinates, e.g. 'S1' 702, 'S2' 704 and 'S3' 706 may depend on number of distinct value-ids and distribution of data in the 'table-A'.

Figure 7B:
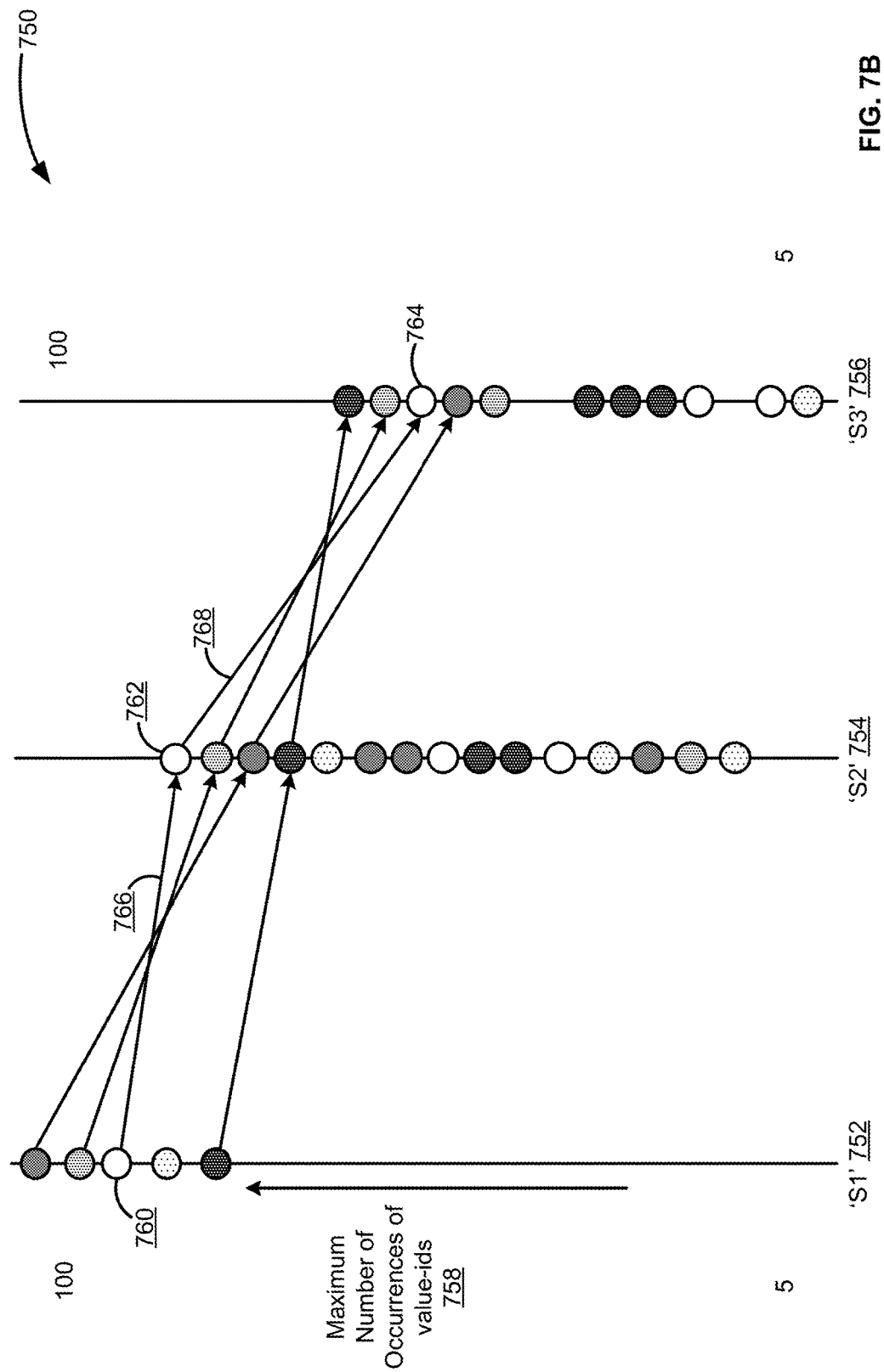
FIG. 7B is an exemplary graphical representation illustrating value-ids that has maximum number of occurrences in an in-memory columnar database table when pareto analysis is applied on FIG. 7A, according to one embodiment.

FIG. 7B is an exemplary graphical representation 750 illustrating value-ids that has maximum number of occurrences in an in-memory columnar database table when pareto analysis is applied on FIG. 7A, according to one embodiment. The graphical representation 750 may be in form of a bubble chart generated when a pareto analysis is applied on the graphical represented 700, as shown in FIG. 7A. The pareto analysis selects the most dominant value-id from the first column and maintains integrity of the records by selecting corresponding dominant value-ids in the second column and third column. As a result, pareto analysis removes combination of value-ids across the columns that has maximum number of occurrences comparatively low or leads to low valued best compression score ($B_{CS}$). Parallel coordinates such as 'S1' 752 represents first column, 'S2' 754 represents second column, and 'S3' 756 represents third column of the 'table-A'. The parallel coordinates 'S1' 752, 'S2' 754 and 'S3' 756 illustrate maximum number of occurrences of value-ids or dominant value-ids in each column. The parallel coordinates 'S1' 752, 'S2' 754 and 'S3' 756 has maximum limit '100' and minimum limit '5' indicating maximum number of occurrences of value-ids 758 within a range [5 to 100].

For example, combination of the value-ids represented by bubbles 760, 762 and 764 connected by director indicators 766 and 768 on the parallel coordinates 'S1' 752, 'S2' 754 and 'S3' 756, dominates majority of the existing combinations of value-ids. Since, the bubbles 760, 762 and 764 appears at the top or nearly at the top of the parallel coordinates 'S1' 752, 'S2' 754 and 'S3' 756. Additionally, when bubbles are positioned at the top of the parallel coordinates 'S1' 752, 'S2' 754 and 'S3' 756, the maximum number of occurrences of the value-ids 758 are comparatively high. When the bubbles are positioned at the bottom or nearly towards bottom of the parallel coordinates 'S1' 752, 'S2' 754 and 'S3' 756, the maximum number of occurrences of the value-ids 758 are comparatively low. The graphical representation 750 may be an interactive graph, for example, the administrator or user is able to access the bubbles 760, 762 and 764 and/or the direction indicators 766 and 768. The best compression score ($B_{CS}$) may be computed using equation (eq. 3, shown in paragraph [0051]) for the selected combination value-ids in the parallel coordinates 'S1' 752, 'S2' 754 and 'S3' 756. In addition, the combination of value-ids used in computing best compression score ($B_{CS}$), the corresponding bubbles may be highlighted in the graphical representation 750. For example, bubbles 758, 760 and 762 may be highlighted to indicate combination of selected value-ids from the first column, second column and third column respectively.

In one embodiment, records in the 'table-A' are grouped and/or shifted to top of the 'table-A'. As a result, the continuous row indexes, e.g. record serial numbers, are grouped together that helps in compressing the records as single memory unit. To group the row indexes, the row indexes are scanned and row index array(s) may be is generated. For example, a set of row indexes may include {5, 20, 34, 35, 36, 37, 38, 39, 40, 55, 63, 64, 65, 66, 67, 75, 88, 95}. The row index arrays (RI) generated for the abovementioned row index set are as follows:

$RI_1$={5,20,55,75,88,95} and $RI_2$={(34,40),(63,67)}

The above approach may assists in optimizing grouping of records in the in-memory columnar database table.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
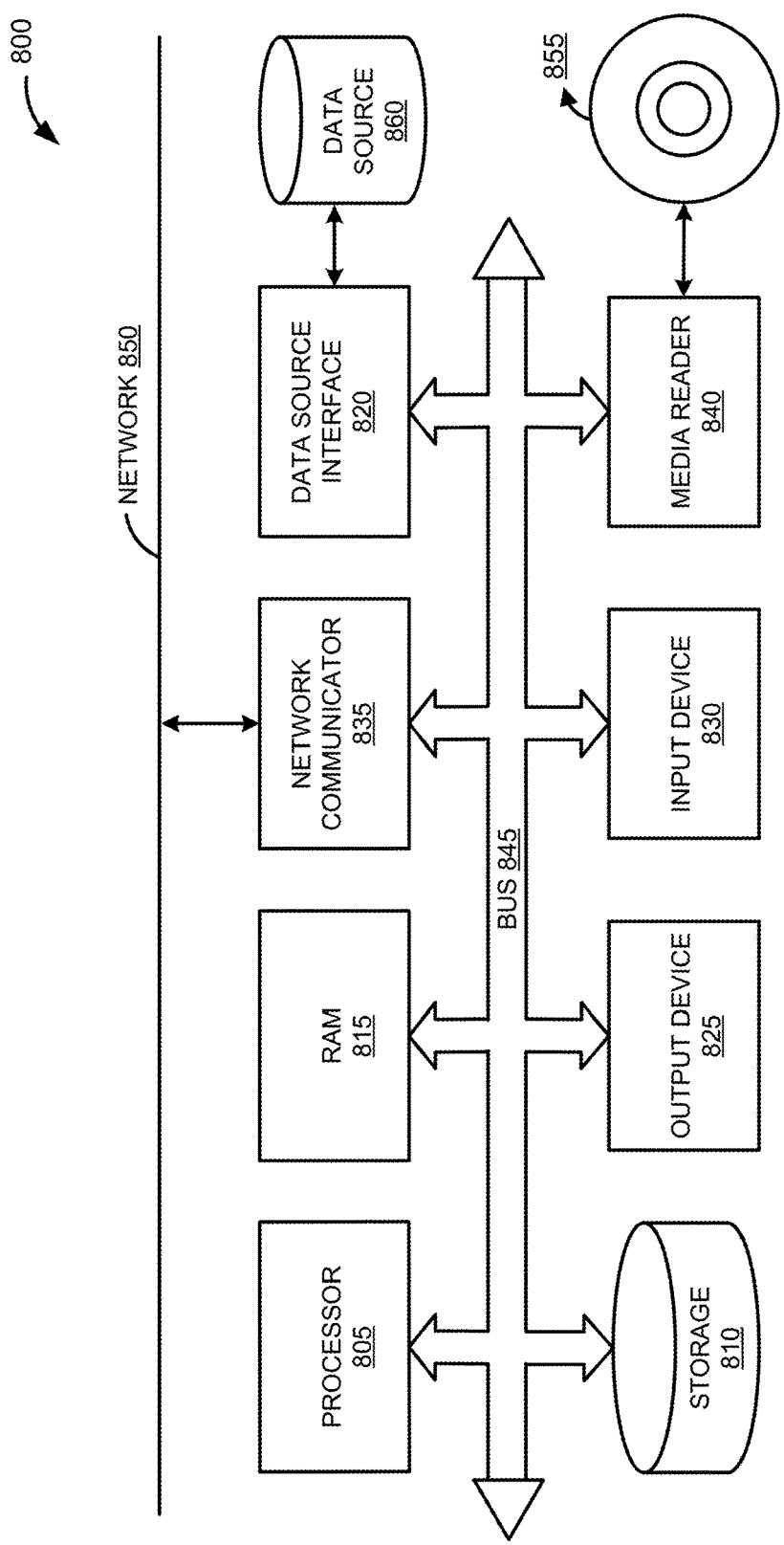
FIG. 8 is a block diagram illustrating an exemplary computer system to optimize in-memory column based database table compression, according to one embodiment.

FIG. 8 is a block diagram of an exemplary computer system 800 to optimize in-memory column based database table compression, according to one embodiment. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

The invention claimed is:

1. A computer implemented method for optimizing in-memory column based database table compression, the method comprising:
   parsing an in-memory columnar database table;
   reading an aggregated compression score for the in-memory columnar database table;
   iteratively computing a total compression score for the in-memory columnar database table, the computing of the total compression score comprising:
      appending records in the in-memory columnar database table;
      for each of the plurality of columns in the in-memory columnar database table:
         sorting the value-ids in a column from the plurality of columns to identify a latest dominant value-id, wherein the latest dominant value-id is one of the value-ids that has a maximum number of occurrences in the column;
         grouping records in the in-memory columnar database table corresponding to the identified latest dominant value-id in the column from the plurality of columns by setting a latest pointer corresponding to the identified latest dominant value-id;
         sorting the value-ids in a subsequent column from the plurality of columns to identify a subsequent latest dominant value-id until the latest pointer, wherein the subsequent latest dominant value-id is one of the value-ids that has maximum number of occurrences in the subsequent column;
         computing a compression score for the latest dominant value-id from the plurality of value-ids in the column from the plurality of columns; and
         aggregating the compression score computed for the each of the plurality of columns as the total compression score;
   upon determining that the aggregated compression score is less than the total compression score, update a best compression score with the total compression score; and
   compressing a total memory required to store the in-memory columnar database table by the best compression score.

2. The method as claimed in claim 1, wherein reading the aggregated compression score further comprising:
   for each of a plurality of columns in the in-memory columnar database table:
   sorting value-ids in a column from the plurality of columns to identify a dominant value-id, wherein the dominant value-id is one of the value-ids that has a maximum number of occurrences in the column;
   grouping records in the in-memory columnar database table corresponding to the identified dominant value-id in the column from the plurality of columns by setting a pointer corresponding to the identified dominant value-id;
   sorting the value-ids in a subsequent column from the plurality of columns to identify a subsequent dominant value-id until the pointer, wherein the subsequent dominant value-id is one of the value-ids that has a maximum number of occurrences in the subsequent column;
   computing a compression score for the dominant value-id in the column from the plurality of columns; and
   aggregating the compression score computed for the each of the plurality of columns.

3. The method as claimed in claim 2, wherein computing the total compression score further comprising:
   for each of the plurality of columns in the in-memory columnar database table:
   sorting value-ids in a column from the plurality of columns to identify a new dominant value-id, wherein the new dominant value-id is one of the value-ids that has a maximum number of occurrences closest to the maximum number of occurrences of the dominant value-id;
   grouping records in the in-memory columnar database table corresponding to the identified new dominant value-id in the column from the plurality of columns by setting a new pointer corresponding to the identified new dominant value-id;
   sorting the value-ids in a subsequent column from the plurality of columns to identify a subsequent new dominant value-id until the new pointer, wherein the subsequent new dominant value-id is one of the value-ids that has a maximum number of occurrences in the subsequent column;
   computing a compression score for the new dominant value-id from the plurality of value-ids in the column from the plurality of columns; and
   aggregating the compression score computed for the each of the plurality of columns as the total compression score.

4. The method as claimed in claim 1, wherein upon determining that the aggregated compression score is greater than the total compression score, iteratively compute the total compression score.

5. The method as claimed in claim 1, further comprising:
generating a tree having nodes to represent the in-memory columnar database table; and
generating the nodes in hierarchical levels, wherein each hierarchical level corresponds to each column from the plurality of columns in the in-memory columnar database table.

6. The method as claimed in claim 1, further comprising:
generating a new column that is an aggregate of value-ids of records in the in-memory columnar database table; and
computing the total compression score based on the generated new column.

7. A computer system for optimizing in-memory column based database table compression comprising:
a memory to store a program code;
a processor communicatively coupled to the memory, the processor configured to execute the program code to:
parse an in-memory columnar database table;
read an aggregated compression score for the in-memory columnar database table;
iteratively compute a total compression score for the in-memory columnar database table, by further executing the program code to:
append records in the in-memory columnar database table;
for each of the plurality of columns in the in-memory columnar database table:
sort value-ids in a column from the plurality of columns to identify a latest dominant value-id, wherein the latest dominant value-id is one of the value-ids that has maximum number of occurrences in the column;
group records in the in-memory columnar database table corresponding to the identified latest dominant value-id in the column from the plurality of columns by setting a latest pointer corresponding to the identified latest dominant value-id;
sort the value-ids in a subsequent column from the plurality of columns to identify a subsequent latest dominant value-id until the latest pointer, wherein the subsequent latest dominant value-id is one of the value-ids that has maximum number of occurrences in the subsequent column;
compute a compression score for the latest dominant value-id in the column from the plurality of columns; and
aggregate the compression score computed for the each of the plurality of columns as the total compression score;
upon determined that the aggregated compression score is less than the total compression score, update a best compression score with the total compression score; and
compress a total memory required to store the in-memory columnar database table by the best compression score.

8. The computer system of claim 7, wherein read the aggregated compression score further executes the program code to:
for each of a plurality of columns in the in-memory columnar database table:
sort value-ids in a column from the plurality of columns to identify a dominant value-id, wherein the dominant value-id is one of the value-ids that has a maximum number of occurrences in the column;
group records in the in-memory columnar database table corresponding to the identified dominant value-id in the column from the plurality of columns by setting a pointer corresponding to the identified dominant value-id;
sort the value-ids in a subsequent column from the plurality of columns to identify a subsequent dominant value-id until the pointer, wherein the subsequent dominant value-id is one of the value-ids that has a maximum number of occurrences in the subsequent column from the plurality of columns;
compute a compression score for the dominant value-id in the column from the plurality of columns; and
aggregate the compression score computed for the each of the plurality of columns.

9. The computer system of claim 8, wherein compute the total compression score further executes the program code to:
for each of the plurality of columns in the in-memory columnar database table:
sort value-ids in a column from the plurality of columns to identify a new dominant value-id, wherein the new dominant value-id is one of the value-ids that has a maximum number of occurrences closest to the maximum number of occurrences of the dominant value-id in the column;
group records in the in-memory columnar database table corresponding to the identified new dominant value-id in the column from the plurality of columns by setting a new pointer corresponding to the identified new dominant value-id;
sort the value-ids in a subsequent column from the plurality of columns to identify a subsequent new dominant value-id until the new pointer, wherein the subsequent new dominant value-id is one of the value-ids that has maximum number of occurrences in the subsequent column;
compute a compression score for the new dominant value-id in the column from the plurality of columns; and
aggregate the compression score computed for the each of the plurality of columns as the total compression score.

10. The computer system of claim 7, wherein the processor further executes the program code to:
upon determined that the aggregated compression score is greater than the total compression score, iteratively compute the total compression score.

11. The computer system of claim 7, wherein the processor further executes the program code to:
generate a tree having nodes to represent the in-memory columnar database table; and
generate the nodes in hierarchical levels, wherein each hierarchical level corresponds to each column from the plurality of columns in the in-memory columnar database table.

12. The computer system of claim 7, wherein the processor further executes the program code to:
generate a new column that is an aggregate of value-ids from plurality of value-ids of records in the in-memory columnar database table; and
compute the total compression score based on the generated new column.

13. A non-transitory computer readable medium to store instructions, which when executed by a computer, causes the computer to perform operations for optimizing in-memory column based database table compression comprising:
  parse an in-memory columnar database table;
  read an aggregated compression score for the in-memory columnar database table;
  iteratively compute a total compression score for the in-memory columnar database table, by further causing the computer to:
    append records in the in-memory columnar database table;
    for each of the plurality of columns in the in-memory columnar database table:
      sort value-ids in a column from the plurality of columns is one of the value-ids that has maximum number of occurrences in the column;
      group records in the in-memory columnar database table corresponding to the identified latest dominant value-id in the column from the plurality of columns by setting a latest pointer corresponding to the identified latest dominant value-id;
      sort the value-ids in a subsequent column from the plurality of columns to identify a subsequent latest dominant value-id until the latest pointer, wherein the subsequent latest dominant value-id is one of the value-ids that has maximum number of occurrences in the subsequent column;
      compute a compression score for the latest dominant value-id in the column from the plurality of columns; and
      aggregate the compression score computed for the each of the plurality of columns as the total compression score;
    upon determined that the aggregated compression score is less than the total compression score, update a best compression score with the total compression score; and
    compress a total memory required to store the in-memory columnar database table by the best compression score.

14. The computer-readable medium of claim 13, wherein reading the aggregated compression score further comprises instructions which when executed by the computer further causes the computer to:
  for each of a plurality of columns in the in-memory columnar database table:
    sort value-ids in a column from the plurality of columns to identify a dominant value-id, wherein the dominant value-id is one of the value-ids that has a maximum number of occurrences in the column;
    group records in the in-memory columnar database table corresponding to the identified dominant value-id in the column from the plurality of columns by setting a pointer corresponding to the identified dominant value-id;
    sort the value-ids in a subsequent column from the plurality of columns to identify a subsequent dominant value-id until the pointer, wherein the subsequent dominant value-id is one of the value-ids that has a maximum number of occurrences in the subsequent column;
    compute a compression score for the dominant value-id in the column from the plurality of columns; and
    aggregate the compression score computed for the each of the plurality of columns.

15. The computer-readable medium of claim 14, wherein computing the total compression score further comprises instructions which when executed by the computer further causes the computer to:
  for each of the plurality of columns in the in-memory columnar database table:
    sort value-ids in a column from the plurality of columns to identify a new dominant value-id, wherein the new dominant value-id is one of the value-ids that has a maximum number of occurrences closes to the maximum number of occurrences of the dominant value-id in the column;
    group records in the in-memory columnar database table corresponding to the identified new dominant value-id in the column from the plurality of columns by setting a new pointer corresponding to the identified new dominant value-id;
    sort the value-ids in a subsequent column from the plurality of columns to identify a subsequent new dominant value-id until the new pointer, wherein the subsequent dominant new value-id is one of the value-ids that has maximum number of occurrences in the subsequent column;
    compute a compression score for the new dominant value-id in the column from the plurality of columns; and
    aggregate the compression score computed for the each of the plurality of columns as the total compression score.

16. The computer-readable medium of claim 13, further comprises instructions which when executed by the computer further causes the computer to:
  upon determined that the aggregated compression score is greater than the total compression score, iteratively compute the total compression score.

17. The computer-readable medium of claim 13, further comprises instructions which when executed by the computer further causes the computer to:
  generate a new column that is an aggregate of value-ids from plurality of value-ids of records in the in-memory columnar database table; and
  compute the total compression score based on the generated new column.

* * * * *